(12) United States Patent
Luan et al.

(10) Patent No.: US 12,307,091 B2
(45) Date of Patent: May 20, 2025

(54) STORAGE METHOD CAPABLE OF BEING CONCURRENTLY ACCESSED BY SPLITTING ACCESS COMMAND, ELECTRONIC DEVICE AND COMPUTER READABLE STORAGE MEDIUM IMPLEMENTING THE SAME

(71) Applicant: HORIZON (SHANGHAI) ARTIFICIAL INTELLIGENCE TECHNOLOGY CO., LTD., Shanghai (CN)

(72) Inventors: Hao Luan, Shanghai (CN); Chang Huang, Shanghai (CN); Yu Yao, Shanghai (CN); Xuan Dong, Shanghai (CN)

(73) Assignee: HORIZON (SHANGHAI) ARTIFICIAL INTELLIGENCE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/315,040

(22) Filed: May 10, 2023

(65) Prior Publication Data

US 2023/0367483 A1 Nov. 16, 2023

(30) Foreign Application Priority Data

May 11, 2022 (CN) .......................... 202210547370.1

(51) Int. Cl.
*G06F 3/06* (2006.01)
(52) U.S. Cl.
CPC .......... *G06F 3/0611* (2013.01); *G06F 3/0659* (2013.01); *G06F 3/0689* (2013.01)
(58) Field of Classification Search
None
See application file for complete search history.

(56) References Cited

U.S. PATENT DOCUMENTS 8,095,744 B2 1/2012 Kawamoto et al.
8,307,190 B2 11/2012 Yamada et al.
(Continued)

FOREIGN PATENT DOCUMENTS

CN 105045525 A 11/2015
CN 106126124 A 11/2016
(Continued)

OTHER PUBLICATIONS

The First Chinese Office Action and its Search Report from Chinese patent application No. 202210547370.1 mailed on May 25, 2023.
(Continued)

*Primary Examiner* — Christopher D Birkhimer
(74) *Attorney, Agent, or Firm* — K&L Gates LLP

(57) ABSTRACT

Disclosed are a storage device and method, an electronic device, and a storage medium. The device includes: a first splitting logical module for splitting a first access command into at least two second access commands based on an access address of the first access command; and at least two storage array modules, each of which is configured to perform a corresponding access operation based on one of the at least two second access commands of the first splitting logical module. According to the embodiments, the first access command with relatively long burst is split into second access commands with smaller granularity, and the at least two storage array modules are parallel accessed, whereby the at least two storage array modules can respond in parallel, effectively reducing response time of the first access command and access time of each master when parallel access of masters exists, then improving access efficiency.

15 Claims, 16 Drawing Sheets

(56) References Cited

U.S. PATENT DOCUMENTS

| | | | |
|---|---|---|---|
| 8,407,433 B2 | 3/2013 | Wingard et al. | |
| 8,661,180 B2 | 2/2014 | Takagi et al. | |
| 9,836,224 B2 | 12/2017 | Seo et al. | |
| 10,102,145 B1* | 10/2018 | Michel | G06F 3/064 |
| 2006/0136683 A1 | 6/2006 | Meyer et al. | |
| 2008/0059683 A1* | 3/2008 | Sullivan | G06F 13/161 |
| | | | 710/306 |
| 2008/0320268 A1 | 12/2008 | Wingard et al. | |
| 2010/0030980 A1 | 2/2010 | Yamada et al. | |
| 2010/0161948 A1* | 6/2010 | Abdallah | G06F 9/3853 |
| | | | 712/228 |
| 2010/0250872 A1 | 9/2010 | Ohhashi et al. | |
| 2012/0311126 A1* | 12/2012 | Jadallah | H04L 65/80 |
| | | | 709/224 |
| 2013/0325998 A1* | 12/2013 | Hormuth | H04L 41/06 |
| | | | 709/212 |
| 2014/0019791 A1* | 1/2014 | Bacigalupo | G06F 13/4291 |
| | | | 713/400 |
| 2015/0253997 A1* | 9/2015 | Kessler | G06F 3/0608 |
| | | | 711/170 |
| 2015/0254183 A1* | 9/2015 | Akkawi | G06F 12/0813 |
| | | | 711/135 |
| 2017/0177241 A1* | 6/2017 | Erickson | G06F 3/0655 |
| 2017/0187496 A1* | 6/2017 | Shalev | H04L 45/24 |
| 2018/0150255 A1 | 5/2018 | Woo et al. | |
| 2018/0181315 A1* | 6/2018 | Kusters | G06F 3/0619 |
| 2019/0116000 A1* | 4/2019 | Thubert | H04L 41/0677 |
| 2019/0124006 A1* | 4/2019 | Thubert | H04L 47/12 |
| 2019/0132253 A1* | 5/2019 | Thubert | H04L 49/9005 |
| 2019/0163651 A1 | 5/2019 | Kowles et al. | |
| 2019/0324666 A1* | 10/2019 | Kusters | G06F 3/0619 |
| 2021/0109681 A1* | 4/2021 | Gissin | G06F 13/4282 |

FOREIGN PATENT DOCUMENTS

| | | |
|---|---|---|
| CN | 108665939 A | 10/2018 |
| CN | 109101185 A | 12/2018 |
| CN | 110007853 A | 7/2019 |
| CN | 110554833 A | 12/2019 |
| CN | 113448495 A | 9/2021 |
| CN | 114356223 A | 4/2022 |
| JP | 2003308248 A | 10/2003 |
| JP | 2004246862 A | 9/2004 |
| JP | 2009193107 A | 8/2009 |
| JP | 2010262429 A | 11/2010 |
| JP | 2010287058 A | 12/2010 |
| JP | 2011054184 A | 3/2011 |
| JP | 2014021952 A | 2/2014 |
| WO | 2008/084681 A1 | 7/2008 |

OTHER PUBLICATIONS

The Extended European Search Report from the corresponding European Patent Application No. 23165281.9 mailed on Sep. 25, 2023.

The First Japanese Office Action from the corresponding Japanese Patent Application No. 2023-051902 mailed on Mar. 26, 2024.

* cited by examiner

STORAGE METHOD CAPABLE OF BEING CONCURRENTLY ACCESSED BY SPLITTING ACCESS COMMAND, ELECTRONIC DEVICE AND COMPUTER READABLE STORAGE MEDIUM IMPLEMENTING THE SAME

CROSS-REFERENCE TO RELATED APPLICATIONS

The present application claims priority to Chinese patent application number 202210547370.1 filed on May 11, 2022, which is incorporated herein by reference in its entirety as set forth in full.

FIELD OF THE INVENTION

The present disclosure relates to storage technologies, and in particular, to a storage device and method, an electronic device, and a storage medium.

BACKGROUND OF THE INVENTION

With rapid development of the autopilot technology, deep learning chips for autopilot usually have storage requirements on multi-core heterogeneity, large computing power, large bandwidth, and high parallelism. In related technologies, a master such as an accelerator or a processor core accesses a memory by using a bus. When the memory is accessed by a plurality of masters at the same time, arbitration needs to be performed via the bus by using a length of a read/write access burst, so as to determine an access order of each master to a memory module. The memory responds to an access command of each master in sequence. As a result, read/write access time of the master to the memory is extended and efficiency of the read/write access is relatively low.

SUMMARY OF THE INVENTION

The present disclosure is proposed to resolve the foregoing technical problems such as low efficiency of read/write access. Embodiments of this disclosure disclose a storage device and method, an electronic device, and a storage medium.

According to an aspect of embodiments of this disclosure, a storage device is provided, wherein the storage device includes: a first splitting logical module, configured to split a first access command into at least two second access commands based on an access address of the first access command; and at least two storage array modules, wherein each storage array module of the at least two storage array modules is configured to perform a corresponding access operation based on one of the at least two second access commands of the first splitting logical module.

According to another aspect of embodiments of this disclosure, a storage method is provided, wherein the storage method includes: splitting a first access command into at least two second access commands based on an access address of the first access command; and performing a corresponding access operation based on the at least two second access commands.

According to still another aspect of embodiments of this disclosure, a computer readable storage medium is provided, wherein the storage medium stores a computer program, and the computer program is used for implementing the storage method described in any one of the foregoing embodiments of this disclosure.

According to still another aspect of an embodiment of this disclosure, an electronic device is provided, wherein the electronic device includes: a processor; and a memory configured to store processor-executable instructions, wherein the processor is configured to read the executable instructions from the memory and execute the instructions to implement the storage method described in any one of the foregoing embodiments of this disclosure; or the electronic device includes the storage device described in any one of the foregoing embodiments.

According to the storage device and method, the electronic device, and the storage medium that are provided in the embodiments of this disclosure, the first access command with a relatively long burst is split into second access commands with smaller granularity by using the first splitting logical module, and the at least two storage array modules are accessed in parallel, so that the at least two storage array modules can respond in parallel, thereby effectively reducing response time of the first access command with a relatively long burst. In this way, when parallel access of a plurality of masters exists, access time of each master can be effectively reduced, thereby improving access efficiency.

The technical solutions of this disclosure are further described below in detail with reference to the accompanying drawings and the embodiments.

BRIEF DESCRIPTION OF THE DRAWINGS

By describing the embodiments of this disclosure more detailed with reference to the accompanying drawings, the foregoing and other objectives, features, and advantages of this disclosure will become more apparent. The accompanying drawings are used to provide further understanding of the embodiments of this disclosure, constitute a part of the specification, are used to explain this disclosure together with the embodiments of this disclosure, and do not constitute limitation to this disclosure. In the accompanying drawings, the same reference numerals generally represent the same components or steps.

DETAILED DESCRIPTION OF THE EMBODIMENTS

Figure 1:
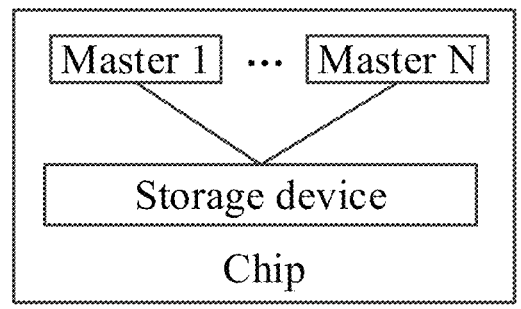
FIG. 1 is an exemplary application scenario of a storage device according to this disclosure.

Exemplary embodiments of this disclosure are described below in detail with reference to the accompanying drawings. Obviously, the described embodiments are merely a part, rather than all of embodiments of this disclosure. It should be understood that this disclosure is not limited by the exemplary embodiments described herein.

It should be noted that unless otherwise specified, the scope of this disclosure is not limited by relative arrangement of components and steps, numeric expressions, and numerical values described in these embodiments.

A person skilled in the art may understand that terms such as "first" and "second" in the embodiments of this disclosure are merely configured to distinguish between different steps, devices, or modules, and indicate neither any particular technical meaning, nor necessarily logical order among them.

It should be further understood that, in the embodiments of this disclosure, the term "multiple"/"a plurality of" may refer to two or more; and the term "at least one" may refer to one, two, or more.

In addition, the term "and/or" in this disclosure refers to only an association relationship that describes associated objects, indicating presence of three relationships. For example, A and/or B may indicate presence of three cases: A alone, both A and B, and B alone. In addition, the character "/" in this disclosure generally indicates an "or" relationship of associated objects.

It should be further understood that, the descriptions of the various embodiments of this disclosure focus on differences among the various embodiments. The same or similar parts among the embodiments may refer to one another and are not repeatedly described for concision.

Descriptions of at least one exemplary embodiment below are actually illustrative only, and never serve as any limitation to this disclosure along with application or use thereof.

Technologies, methods, and devices known by a person of ordinary skills in the art may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of this disclosure can be applicable to a terminal device, a computer system, a server, and other electronic devices, which can be operated together with numerous other general-purpose or special-purpose computing system environments or configurations. Well-known examples of a terminal device, a computing system, and environment and/or configuration applicable to be used with these electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems, etc.

Overview of this Disclosure

In a process of implementing this disclosure, the inventor finds: Deep learning chips for autopilot usually have storage requirements on multi-core heterogeneity, large computing power, large bandwidth, and high parallelism, and a master such as an accelerator or a processor core accesses a memory by using a bus; and when the memory is accessed by a plurality of masters at the same time, arbitration needs to be performed via the bus by using a length of a read/write access burst, so as to determine an access order of each master to a memory module, and the memory responds to an access command of each master in sequence, which causes read/write access time of the master to the memory to be extended and efficiency of the read/write access to be relatively low. Burst refers to accessing of a plurality of consecutive storage addresses in a bus cycle. For example, a burst access command includes a start address to be accessed and an access length, indicating that a quantity of consecutive storage addresses starting with the start address are to be accessed, where the quantity is equal to the access length.

Exemplary Overview

FIG. 1 is an exemplary application scenario of a storage device according to this disclosure.

In this scenario, a storage array module in the storage device in this disclosure can be accessed by N (N is a positive integer) masters. The master may be any on-chip part, such as an accelerator or a processor core, that needs to access a memory. According to the storage device in this disclosure, a first access command may be split into at least two second access commands by using a first splitting logical module based on an access address of the first access command of the master, and the at least two second access commands obtained through splitting may be responded by at least two storage array modules in parallel, thereby effectively reducing response time of the first access command with relatively long burst. In this way, when parallel access of a plurality of masters exists, access time of each master can be effectively reduced, thereby improving access efficiency. The storage array module may include at least one memory module, and each memory module may include at least one storage unit. The storage unit is a basic unit for the master to access the memory. A quantity of storage units included in the memory module may be set according to actual requirements. A bit width of the memory module may also be set according to actual requirements. For example, the bit width may be set to be the same as a bus data width, or may be set to be greater than or less than the bus data width according to actual requirements. This is not specifically limited. A specific splitting rule of the first splitting logical module may be set according to actual requirements in combination with coding and layout of a storage address. A coding and layout manner of the storage address may be, but is not limited to interleaving layout.

Exemplary Device

Figure 2:
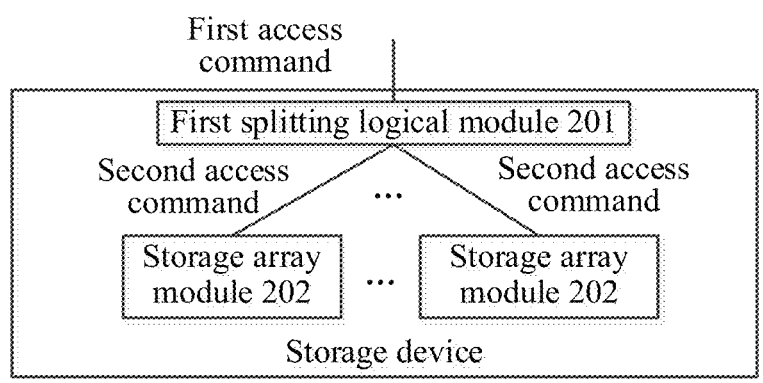
FIG. 2 is a schematic structural diagram of a storage device according to an exemplary embodiment of this disclosure.

FIG. 2 is a schematic structural diagram of a storage device according to an exemplary embodiment of this disclosure. The device in this embodiment may be configured to implement the corresponding method embodiments of this disclosure. The device shown in FIG. 2 includes a first splitting logical module 201 and at least two storage array modules 202.

The first splitting logical module 201 is configured to split a first access command into at least two second access commands based on an access address of the first access command. Each storage array module 202 of the at least two storage array modules is configured to perform a corresponding access operation based on one of the at least two second access commands of the first splitting logical module 201.

The first access command may be an access command generated by any master. The first access command may include an access address; for example, it includes an access start address and an access length. The first access command may be split based on the access address of the first access command. For example, the first access command is split into at least two second access commands with relatively small lengths based on the access start address and the access length of the first access command. The second access command also includes an access start address and an access length. The access length of the second access command is less than that of the first access command. For example, the first access command has an access start address of 2000 and an access length of 8, and is split into two second access commands, one of which has a start address of 2000 and an access length of 4, and the other of which has a start address of 2004 and an access length of 4. A quantity of the second access commands obtained through splitting may be set according to actual requirements. The quantity of the second access commands is the same as that of the storage array modules 202, so that parallel response to all the second access commands can be achieved. The storage array module 202 may include at least one memory module, and each memory module may include at least one storage unit. Specific partition of the storage array modules 202 can be set according to actual requirements. The first splitting logical module 201 can be implemented by any device with a processing function, and this is not limited in this disclosure.

In an optional example, there may be one or more masters to perform access at the same time, that is, there may be one or more first access commands at the same time.

In an optional example, for a plurality of first access commands, an access order of the first access commands of various masters may be determined by arbitrating via a bus by using a length of a read/write access burst. The first access commands are split in sequence, and are transmitted to each storage array module 202. Access time of each master is reduced through parallel response of the storage array modules 202, thereby improving access efficiency.

In an optional example, a plurality of first access commands may alternatively be split in parallel. To be specific, each first access command is split into at least two second access commands in parallel, and the at least two second access commands are transmitted to the corresponding storage array module 202 based on an access address of the second access command and according to an address layout rule of the storage array module 202, so that the storage array module 202 responds to the second access command of accessing this storage array module 202. The access efficiency can be further improved through parallel splitting. The address layout rule of the storage array module 202 may be set according to actual requirements, which is not specifically limited. For example, when the second access commands of at least two different masters need to access a same storage array module 202 at the same time, arbitration may be performed in the storage array module 202, to determine an access order of the second access commands. The storage array module 202 responds to the second access commands in sequence. The arbitration is performed in a stage of the second access command stage with relatively small granularity, response time of each second access command is relatively small, and at least two sets of second access commands are responded to in parallel. Therefore, compared with an existing manner of accessing by a plurality of masters at the same time, the storage device in this disclosure can effectively reduce the access time of each master, and improve the access efficiency.

In an optional example, splitting the first access command by the first splitting logical module 201 may include one or more levels of splitting. A specific quantity of splitting levels and specific splitting granularity at each level may be set according to actual requirements. For example, the first access command may be split into at least two second access commands through one-level splitting, finally split into at least four second access commands through two-level splitting, and finally split into at least eight second access commands through three-level splitting. The others can be deduced by analogy. Each level of splitting is to further split an access command obtained through a previous level of splitting.

In an optional example, each second access command accesses the memory module in the corresponding storage array module 202 based on the access address. Since the storage array module 202 may include at least one memory module, when there are a plurality of second access commands for accessing the same storage array module 202 at the same time, arbitration may be performed prior to each memory module in the storage array module 202 being accessed. In this way, when the plurality of second access commands are to access different memory modules in the storage array module 202, responses can be made in time without queuing, thereby further improving the access efficiency. After the storage array module 202 is reached, there is still a case in which the same memory module is accessed by a plurality of second access commands at the same time. Waiting time is shorter because burst granularity of an access command in a memory-module stage is relatively small, and thus the access efficiency can be effectively improved.

According to the storage device provided in this embodiment, the first access command with relatively long burst is split into second access commands with smaller granularity by using the first splitting logical module, and the at least two storage array modules are accessed in parallel, so that the at least two storage array modules can respond in parallel, thereby effectively reducing response time of the first access command with relatively long burst. In this way, when parallel access of a plurality of masters exists, access time of each master can be effectively reduced, thereby improving the access efficiency.

Figure 3:
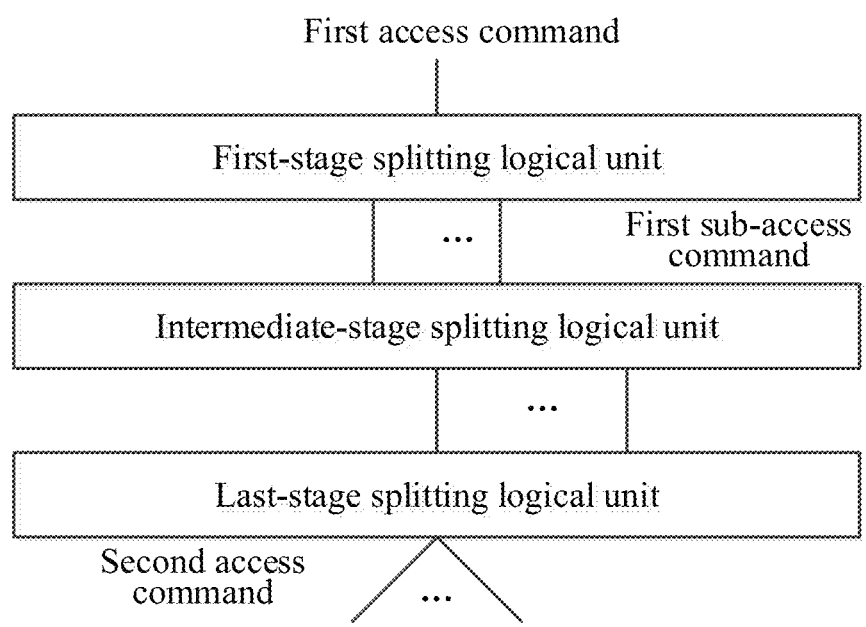
FIG. 3 is a schematic structural diagram of a first splitting logical module 201 according to an exemplary embodiment of this disclosure.

In an optional example, FIG. 3 is a schematic structural diagram of a first splitting logical module 201 according to an exemplary embodiment of this disclosure. In this example, the first splitting logical module 201 includes at least one level of splitting logical units, each level of splitting logical units of the at least one level of splitting logical units including at least one first splitting logical unit, where each first splitting logical unit of a first-level splitting logical unit is configured to perform first-level splitting on the corresponding first access command, to obtain at least two first sub-access commands; each first splitting logical unit of each intermediate-level splitting logical unit is configured to split a corresponding previous-level sub-access command thereof, to obtain at least two current-level sub-access commands; and each first splitting logical unit of a last-level splitting logical unit is configured to split a corresponding previous-level sub-access command thereof, to obtain the at least two second access commands.

A quantity of levels of the splitting logical units can be set according to actual requirements. When there is only one level of splitting logical units, there is no intermediate level or last level. The first sub-access command obtained through the splitting of the first-level splitting logical unit is taken as the second access command. When there are two levels of splitting logical units, there is no intermediate-level splitting logical unit, and a last-level splitting logical unit is taken as a second-level splitting logical unit. Each first sub-access command obtained through splitting of the first-level splitting logical unit is transmitted to the second-level splitting logical unit. The second-level splitting logical unit splits each first sub-access command, and each first sub-access command is split into at least two second sub-access commands. All second sub-access commands obtained by splitting the first sub-access command are taken as the at least two second access commands. A quantity of first splitting logical units included in each level of splitting logical units and a connection relationship between different levels of first splitting logical units may be set according to actual requirements. When there are at least three levels of splitting logical units, an intermediate-level splitting logical unit includes at least one level of splitting logical units. This can be set according to actual requirements, and details are not described herein.

Figure 4:
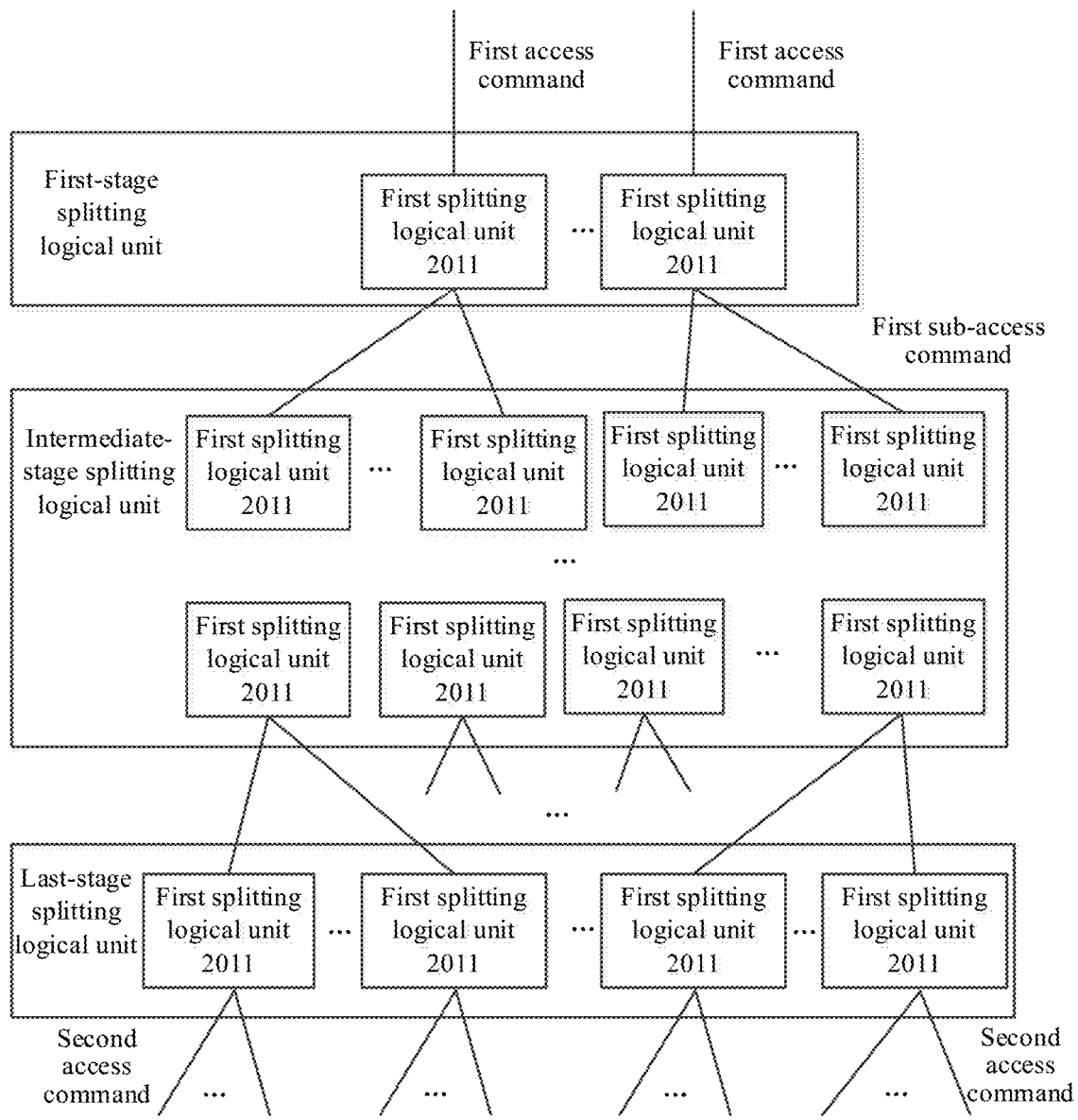
FIG. 4 is a schematic structural diagram of a first splitting logical module 201 according to another exemplary embodiment of this disclosure.

For example, FIG. 4 is a schematic structural diagram of a first splitting logical module 201 according to another exemplary embodiment of this disclosure. Each first splitting logical unit 2011 of each level of splitting logical units is connected to a first splitting logical unit 2011 of a previous level. Each first splitting logical unit of the first-level splitting logical units may be connected to at least one master. Each first splitting logical unit 2011 of the last-level splitting logical units is connected to at least two storage array modules 202. Different first splitting logical units 2011 of the last-level splitting logical unit may be connected to a same storage array module 202, or may be connected to different storage array modules 202. This may be specifically set according to an address coding and layout rule of the storage array module and actual requirements. A connection principle is to ensure that each master can access all storage array modules. The figure does not show a connection relationship between levels in the intermediate levels of splitting logical units and a partial connection relationship between the intermediate level and the last level.

Figure 5:
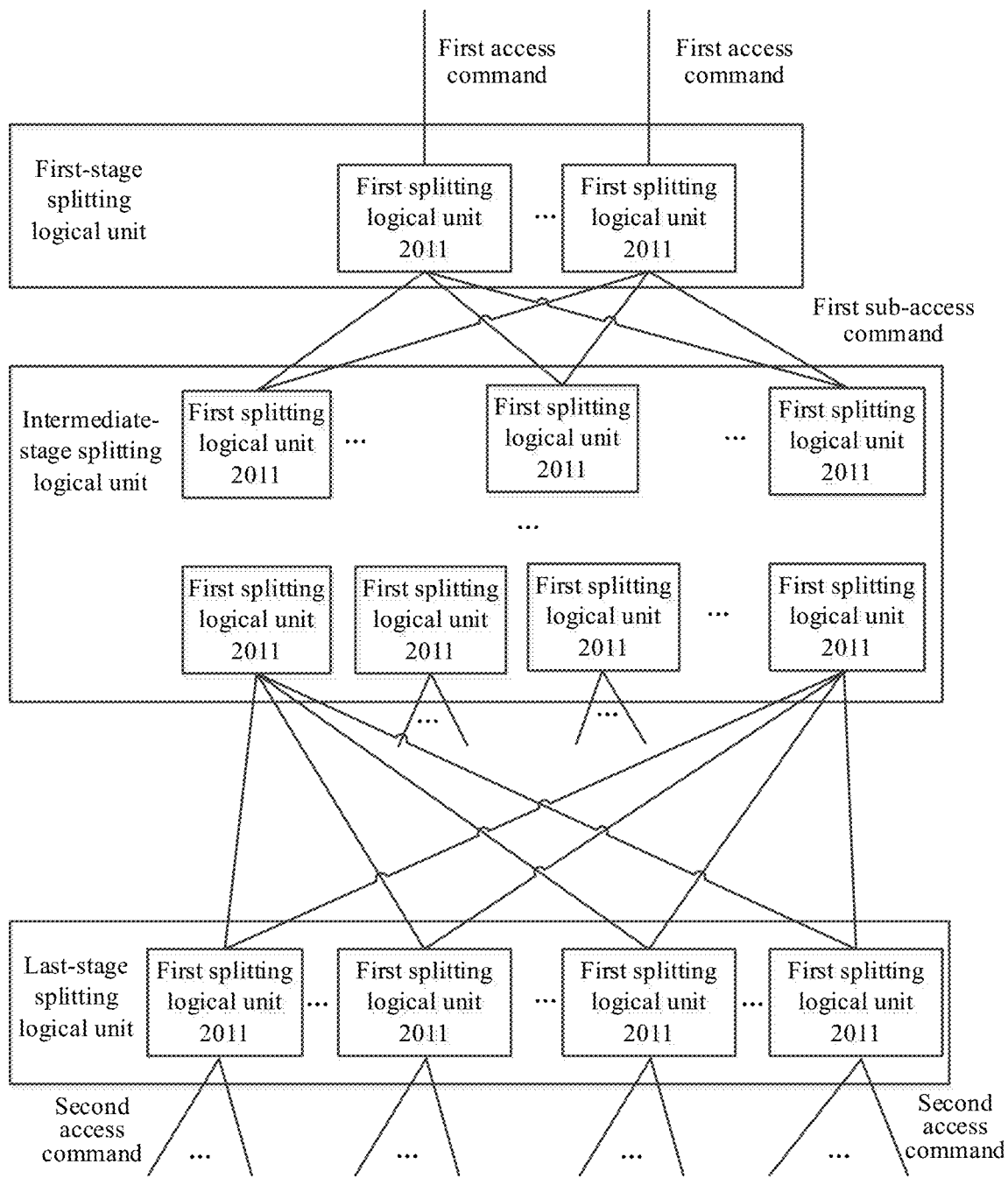
FIG. 5 is a schematic structural diagram of a first splitting logical module 201 according to still another exemplary embodiment of this disclosure.

For example, FIG. 5 is a schematic structural diagram of a first splitting logical module 201 according to still another exemplary embodiment of this disclosure. In this example, each first splitting logical unit 2011 of the first-level splitting logical units may be connected to at least one master. Each first splitting logical unit 2011 of the first-level splitting logical units may be connected to each next-level first splitting logical unit 2011 thereof. Each first splitting logical unit 2011 of the intermediate-level splitting logical units is connected to each next-level first splitting logical unit 2011 thereof. Each first splitting logical unit 2011 of the last-level splitting logical units is connected to at least two storage array modules 202. Different first splitting logical units 2011 of the last-level splitting logical units may be connected to a same storage array module 202, or may be connected to different storage array modules 202. This may be specifically set according to the address coding and layout rule of the storage array module and actual requirements, so that each master can access all storage array modules.

Figure 6:
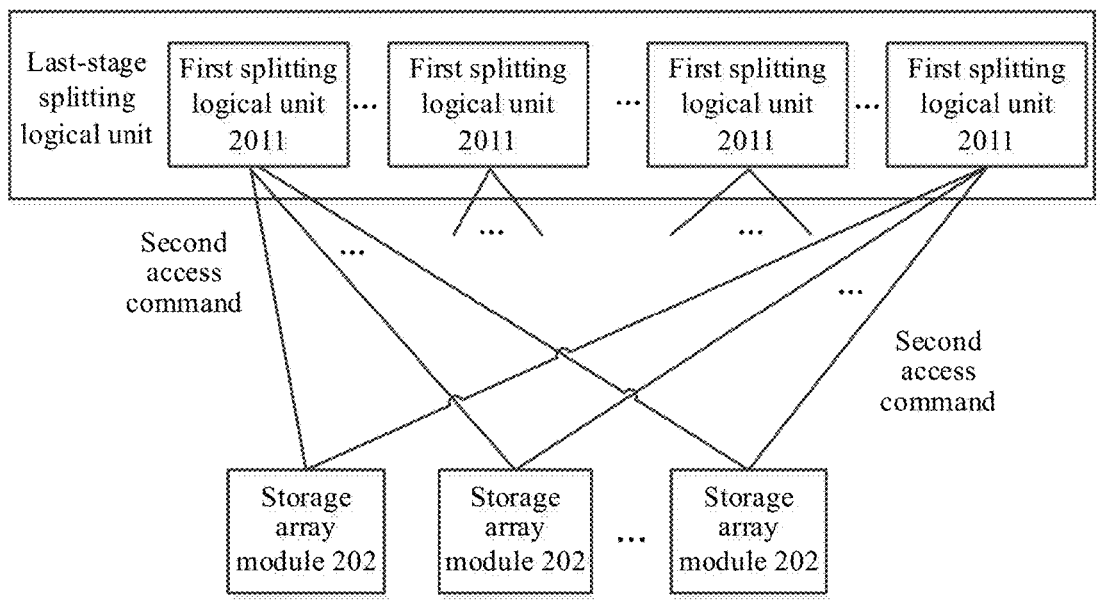
FIG. 6 is a schematic diagram of a connection between a first splitting logical module 201 and a storage array module 202 according to an exemplary embodiment of this disclosure.

For example, FIG. 6 is a schematic diagram of a connection between a first splitting logical module 201 and a storage array module 202 according to an exemplary embodiment of this disclosure. In this example, each first splitting logical unit 2011 of the last-level splitting logical units is connected to all storage array modules 202. The figure only shows a connection relationship between some of the first splitting logical units 2011 and the storage array modules. The rest is not shown, and a connection relationship thereof is similar to that shown.

Figure 7:
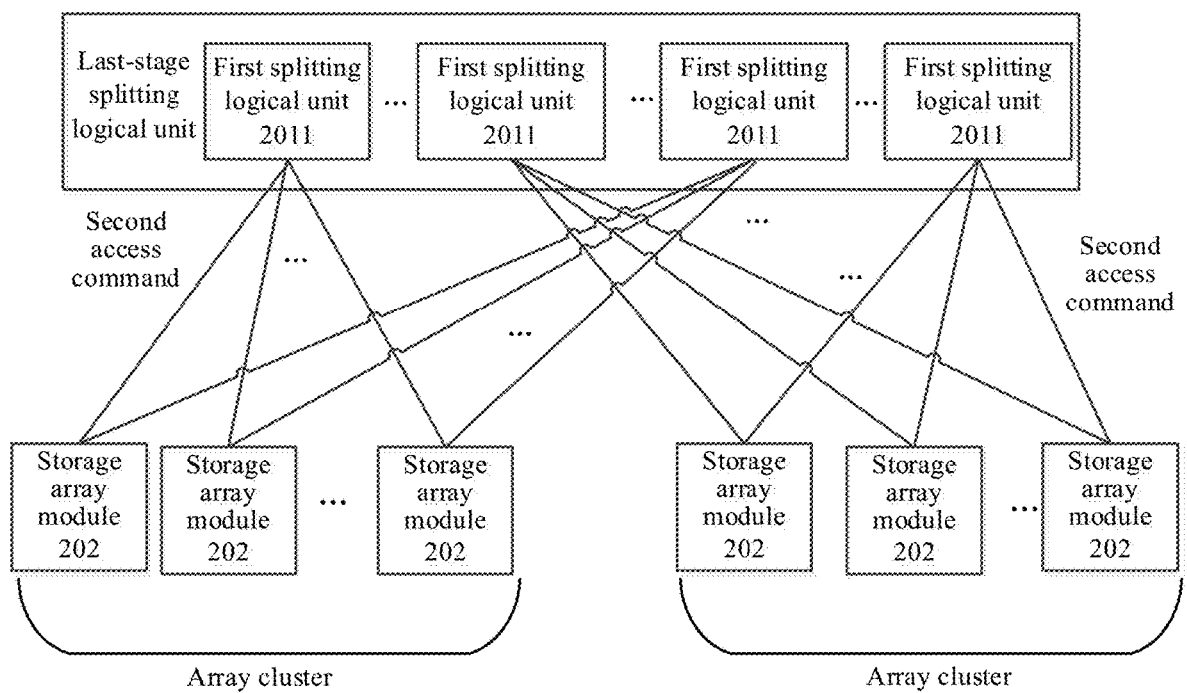
FIG. 7 is a schematic diagram of a connection between a first splitting logical module 201 and a storage array module 202 according to another exemplary embodiment of this disclosure.

For example, FIG. 7 is a schematic diagram of a connection between a first splitting logical module 201 and a storage array module 202 according to another exemplary embodiment of this disclosure. In this example, the first splitting logical units 2011 of the last-level splitting logical units are partitioned into at least two groups according to a preset rule, and the corresponding storage array modules 202 form array clusters. Each group corresponds to one array cluster. Partition of the array clusters may be set according to actual requirements, to facilitate parallel splitting of different first splitting logical units in each level of splitting logical units, and to support parallel response of more storage array modules. When it is ensured that each master can access all the storage array modules, the storage device in this disclosure can be suitable for multi-port parallel access with ultra-large scale and high traffic.

According to this disclosure, the first access command with larger granularity can be split into the second access commands with smaller granularity through multi-level splitting prior to the storage array module, so that a plurality of storage array modules can respond in parallel. In this way, when the access efficiency is improved, multi-port parallel access with large scale and high traffic can be achieved.

Figure 8:
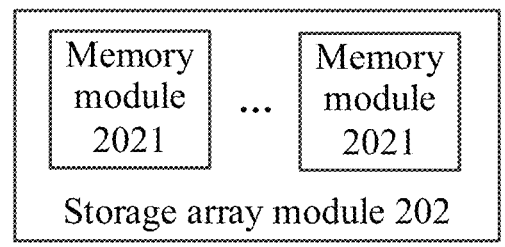
FIG. 8 is a schematic structural diagram of a storage array module 202 according to an exemplary embodiment of this disclosure.

In an optional example, FIG. 8 is a schematic structural diagram of a storage array module 202 according to an exemplary embodiment of this disclosure. In this example, the storage array module 202 includes at least one memory module 2021.

Each memory module 2021 in the at least one memory module includes at least one storage unit. Each memory module is configured to perform a corresponding operation in response to a second access command of accessing the memory module.

A quantity of the storage units included in the memory module 2021 may be set according to actual requirements. This is not limited in this disclosure. The storage unit is a basic unit for the master to access a memory. A specific principle is not described. The memory module is a response module of a burst access command with relatively small granularity that is set according to actual requirements.

In practical application, the memory module may be determined based on a floorplan for a chip design and power consumption of the chip. Running of the memory module at a frequency lower than bus logic would not affect memory access performance of large-block data.

Figure 9:
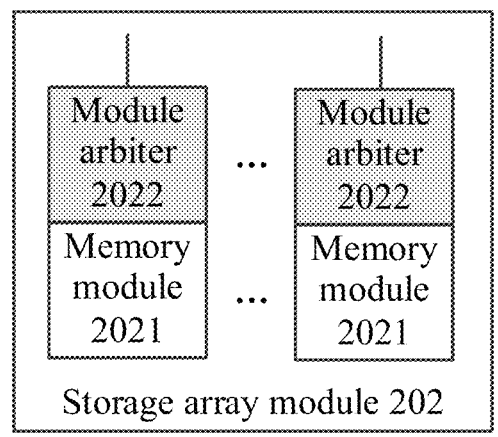
FIG. 9 is a schematic structural diagram of a storage array module 202 according to another exemplary embodiment of this disclosure.

FIG. 9 is a schematic structural diagram of a storage array module 202 according to another exemplary embodiment of this disclosure.

In an optional example, the storage array module 202 in this disclosure further includes:

a module arbiter 2022 corresponding to each memory module 2021 of the at least one memory module.

Each module arbiter 2022 is configured to determine, according to a preset arbitration rule, a target second access command of accessing the memory module 2021 corresponding to the module arbiter 2022, so that the corresponding memory module 2021 responds to the target second access command.

The preset arbitration rule may be set according to actual requirements. For example, the preset arbitration rule may be fair round-robin, first-come-first-served, or the like. This is not specifically limited. When at least two second access commands reach a same module arbiter 2022, this module arbiter 2022 determines an access order for the at least two second access commands according to the preset arbitration rule, and may determine a current second access command of accessing the memory module 2021 corresponding to this module arbiter 2022 as the target second access command according to the access order. If only one second access command currently reaches the module arbiter 2022, the second access command can be directly taken as the target second access command.

Figure 10:
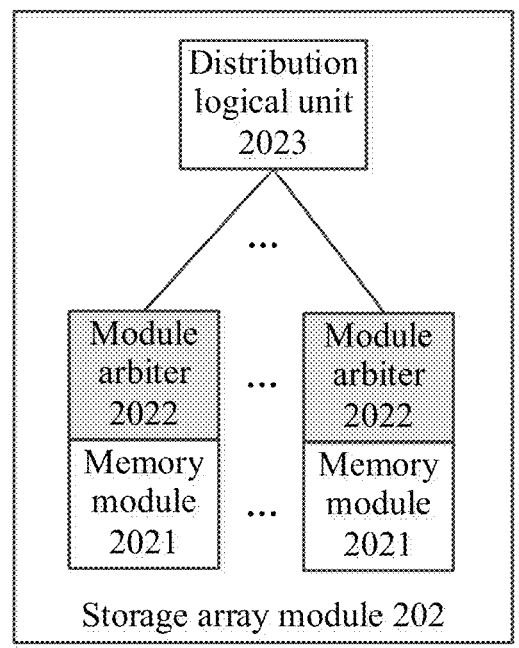
FIG. 10 is a schematic structural diagram of a storage array module 202 according to still another exemplary embodiment of this disclosure.

FIG. 10 is a schematic structural diagram of a storage array module 202 according to still another exemplary embodiment of this disclosure.

In an optional example, the storage array module 202 further includes a distribution logical unit 2023 connected to the first splitting logical module. The distribution logical unit 2023 is further connected to each module arbiter 2022, and is configured to distribute the second access command to the module arbiter 2022 of the corresponding memory module 2021 based on the access address of the second access command.

Figure 11:
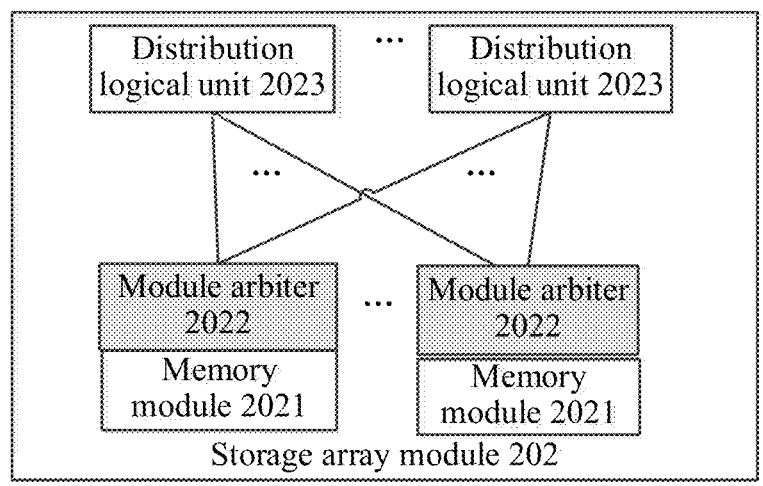
FIG. 11 is a schematic structural diagram of a storage array module 202 according to yet another exemplary embodiment of this disclosure.

A quantity of the distribution logical unit 2023 may be at least one, and it may be specifically set according to actual requirements. For a plurality of distribution logical units 2023, all the distribution logical units 2023 are connected to each module arbiter 2022. Each distribution logical unit 2023 is further connected to the first splitting logical module 201, and is configured to distribute the second access command transmitted by the first splitting logical module 201 to the corresponding module arbiter. For example, FIG. 11 is a schematic structural diagram of a storage array module 202 according to yet another exemplary embodiment of this disclosure. In this example, the storage array module 202 includes a plurality of distribution logical units 2023.

Optionally, each distribution logical unit 2023 in the plurality of distribution logical units may respectively correspond to different masters, so that second access commands of different masters which reach the storage array module 202 are respectively distributed to the module arbiter 2022 of the corresponding memory module 2021 based on access addresses. For such a case, correspondingly, the first splitting logical module 201 may have first splitting logical units respectively corresponding to different masters, to realize parallel splitting of the first access commands of different masters. In this case, the second access commands of all masters obtained by splitting may reach the corresponding distribution logical unit 2023 in the corresponding storage array module 202 in parallel, and then are distributed to the corresponding module arbiter 2022 in parallel. In this way, parallel response of multi-master burst access can be realized, thereby greatly improving the access efficiency. Thus, the storage device in this disclosure can be suitable for multi-port parallel access with ultra-large scale and high traffic.

Figure 12:
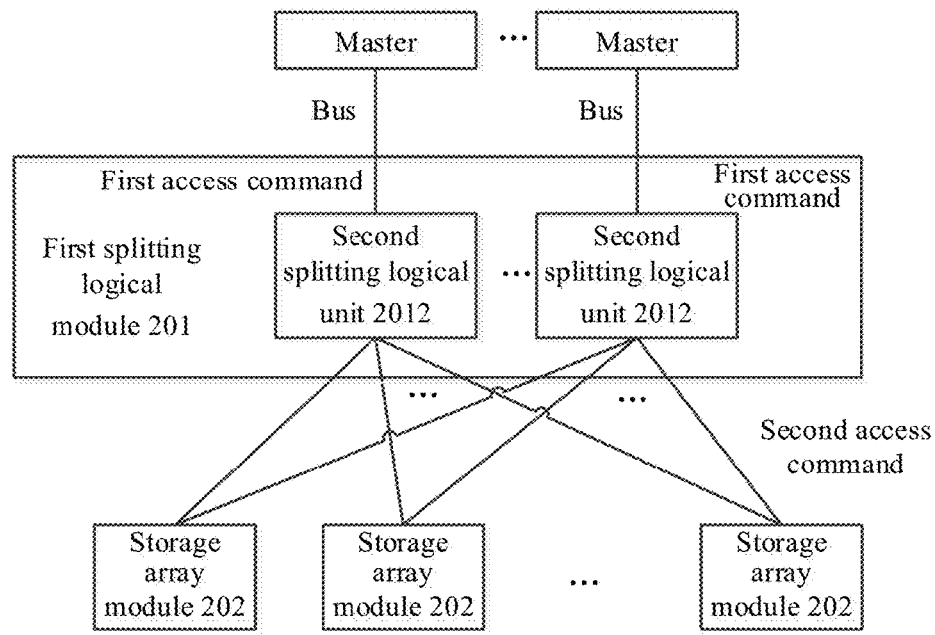
FIG. 12 is a schematic structural diagram of a first splitting logical module 201 according to yet another exemplary embodiment of this disclosure.

FIG. 12 is a schematic structural diagram of a first splitting logical module 201 according to yet another exemplary embodiment of this disclosure.

In an optional example, the first splitting logical module 201 includes at least one second splitting logical unit 2012.

Each second splitting logical unit 2012 in the at least one second splitting logical unit 2012 is connected to one master by using an independent bus, and is connected to the at least two storage array modules 202. The second splitting logical unit 2012 is configured to split the first access command into at least two first sub-access commands based on the access address of the first access command that is generated by the master and according to a preset address coding and layout rule, take the at least two first sub-access commands as the at least two second access commands and transmit the same to the corresponding storage array module 202 in parallel.

The bus may be any implementable bus. This may be specifically set according to actual requirements. The bus may include an address bus, a data bus, a control bus. A specific structure and a specific principle of the bus are not described. The preset address coding and layout rule may be set according to actual requirements, and its purpose is to make the access address of each second access command obtained by splitting the first access command of each master correspond to different storage array modules 202, thereby ensuring parallel response to all second access commands. For example, the preset address coding and layout rule may be an interleaved layout, a high-order cross layout, a low-order cross layout, or the like. This is not specifically limited.

Figure 13:
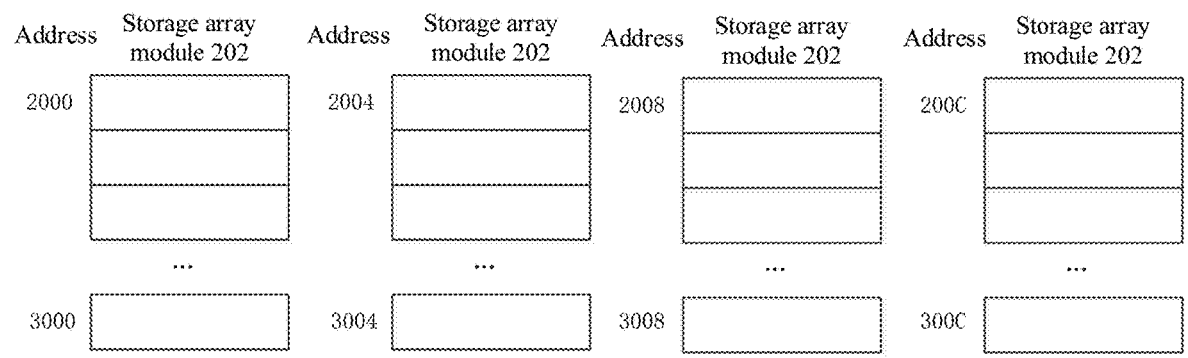
FIG. 13 is a schematic diagram of address coding and layout according to an exemplary embodiment of this disclosure.

For example, FIG. 13 is a schematic diagram of an address coding and layout according to an exemplary embodiment of this disclosure. In this example, the address coding and layout is performed in an interleaved layout mode. For example, the first access command has an access start address of 2000 and an access length of 16, and is split into four second access commands that have an access length of 4 and have access start addresses of 2000, 2004, 2008, and 200C, respectively. In this case, the four second access commands correspond to four different storage array modules 202, and the four storage array modules may respond to the four second access commands in parallel. This is merely an example layout. A quantity of the storage array modules included in the storage device and a quantity of the addresses involved in each storage array module may be set according to actual requirements.

According to this disclosure, each second splitting logical unit 2012 is connected to one master by using an independent bus, and is connected to at least two storage array modules 202. In this way, relatively independent access between the masters is achieved, and access stability can also be improved while the access efficiency is effectively improved.

Figure 14:
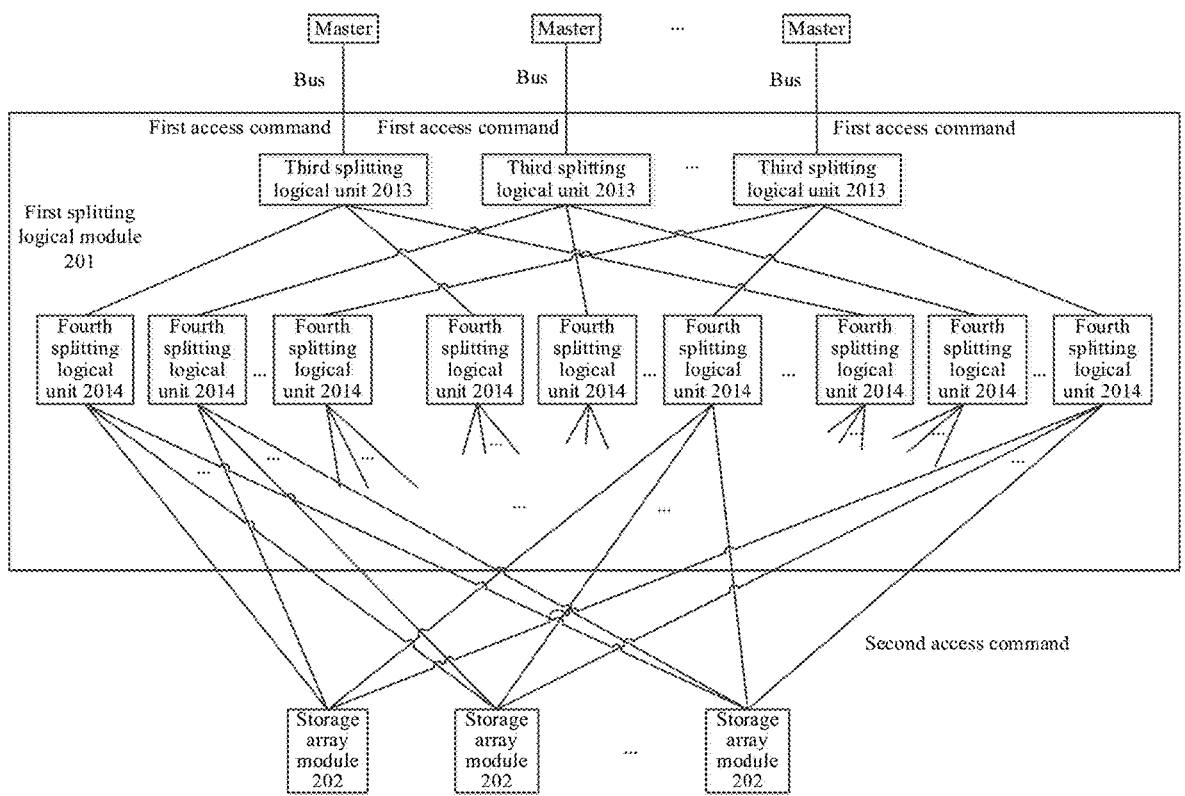
FIG. 14 is a schematic structural diagram of a first splitting logical module 201 according to still another exemplary embodiment of this disclosure.

FIG. 14 is a schematic structural diagram of a first splitting logical module 201 according to still another exemplary embodiment of this disclosure.

In an optional example, the first splitting logical module 201 includes at least one third splitting logical unit 2013, and at least two fourth splitting logical units 2014 corresponding to each third splitting logical unit 2013. Each third splitting logical unit 2013 of the at least one third splitting logical unit is connected to one master by using an independent bus. Each fourth splitting logical unit 2014 is connected to the at least two storage array modules 202. Each third splitting logical unit 2013 splits the first access command into at least two first sub-access commands based on the access address of the first access command that is generated by the master and according to a preset address coding and layout rule, and transmits the at least two first sub-access commands to the at least two fourth splitting logical units 2014 corresponding to the third splitting logical unit 2013 in parallel. Each fourth splitting logical unit 2014 is configured to split the first sub-access command into at least two second sub-access commands based on an access address of the first sub-access command of the third splitting logical unit 2013 and according to the preset address coding and layout rule, take each second sub-access command as one second access command, and transmit respective second access commands to respective storage array modules 202 in parallel.

The preset address coding and layout rule may be set according to actual requirements. In this example, the first splitting logical module 201 includes two levels of splitting logical units. The first-level splitting logical unit includes at least one third splitting logical unit 2013. Each third splitting logical unit 2013 is connected to one master by using an independent bus, so that the first access commands of different masters can be split in parallel. In the second-level splitting logical units, each third splitting logical unit 2013 has at least two corresponding fourth splitting logical units 2014. In this way, the first access commands of different masters are performed with two-level splitting, to obtain the corresponding second access commands. Each fourth splitting logical unit 2014 is connected to each storage array module 202 in the at least two storage array modules. To display clearly, the figure only shows connections between some of the fourth splitting logical units 2014 and the storage array modules 202. The other fourth splitting logical units 2014 are also connected to each storage array module 202, which is not shown.

Figure 15:
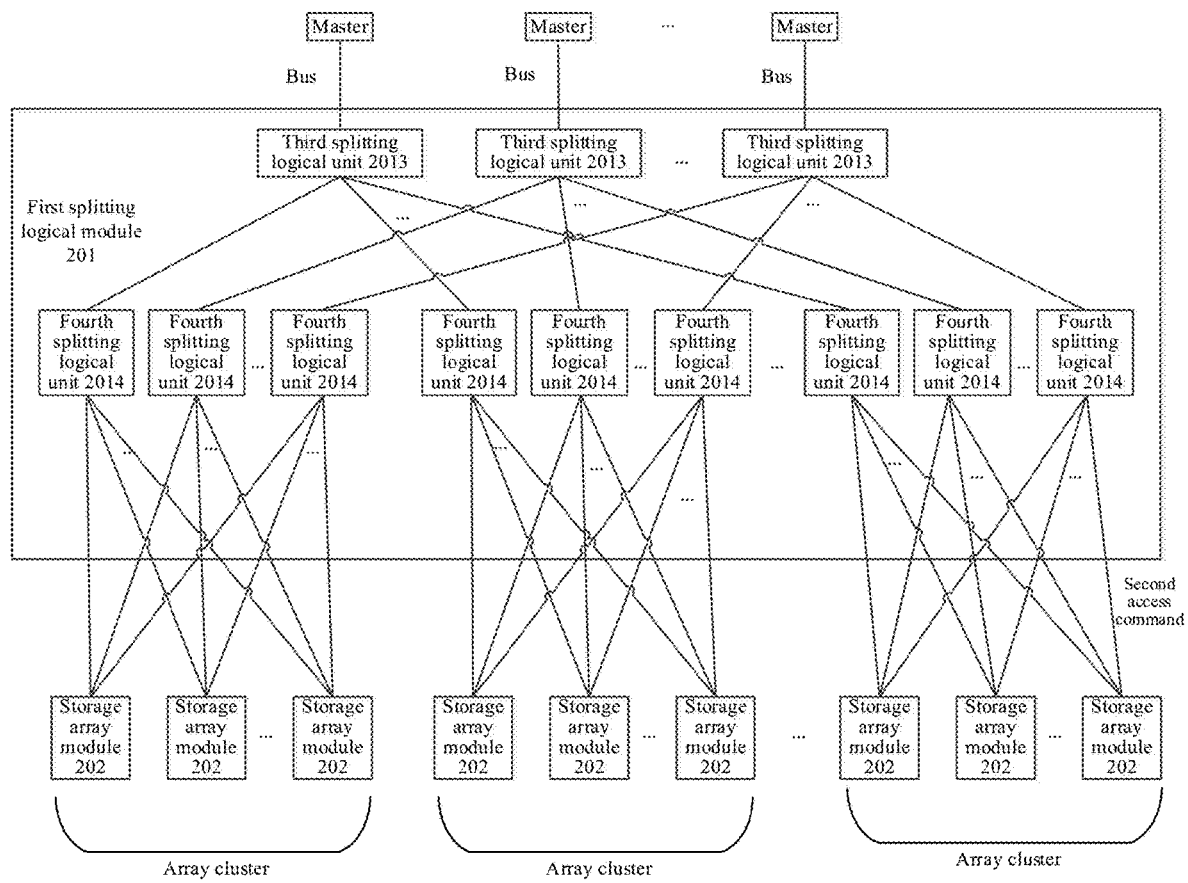
FIG. 15 is a schematic structural diagram of a first splitting logical module 201 according to yet another exemplary embodiment of this disclosure.

FIG. 15 is a schematic structural diagram of a first splitting logical module 201 according to yet another exemplary embodiment of this disclosure.

In an optional example, the at least two storage array modules 202 form at least one array cluster according to the preset address coding and layout rule. Different fourth splitting logical units 2014 under a same third splitting logical unit 2013 (that is, different fourth splitting logical units 2014 corresponding to the same third splitting logical unit 2013) correspond to different array clusters. Each fourth splitting logical unit 2014 under the same third splitting logical unit 2013 is connected to all the storage array modules 202 in the corresponding array cluster.

A quantity of the array modules 202 included in the array cluster may be set according to actual requirements. For example, each array cluster may include 2, 3, 4 storage array modules. Partition of the array cluster may be determined based on a quantity of the fourth splitting logical units 2014 in a second level that are corresponding to the third splitting logical unit 2013 of each master, to ensure that all the second access commands obtained by performing multi-level splitting on each first access command correspond to different storage array modules, and that the first access commands of different masters can be isolated from each other when different addresses are accessed. When accessing a same address, the first access commands of different masters may correspond to more storage array modules after being performed with multi-level splitting, to perform parallel response with smaller granularity, thereby further improving the access efficiency, and enabling the storage device to be suitable for multi-port parallel access with larger scale and higher traffic. When a quantity of the storage array modules is set to be relatively large and array cluster partition is performed, access from different masters may hardly reach a same memory module in a same storage array module at the same time, thereby effectively reducing queuing of access and improving access stability.

Figure 16:
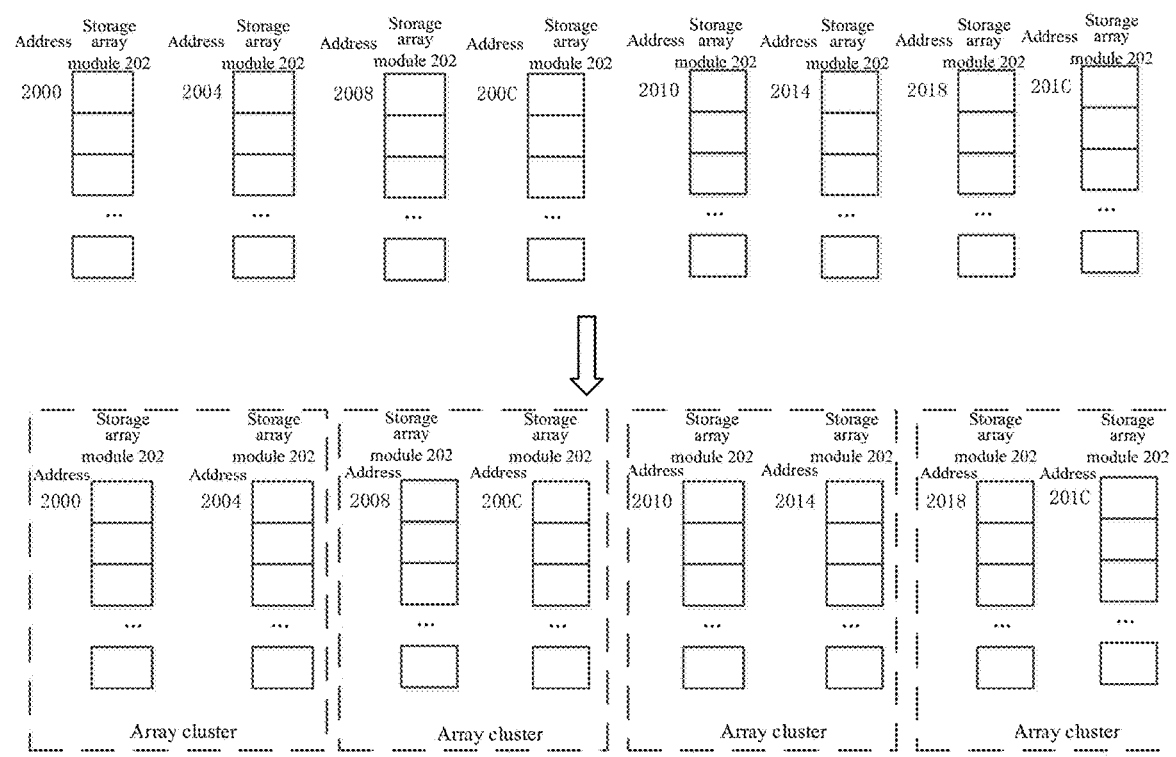
FIG. 16 is a schematic diagram of array cluster partition according to an exemplary embodiment of this disclosure.

For example, FIG. 16 is a schematic diagram of array cluster partition according to an exemplary embodiment of this disclosure. In this example, there are 8 storage array modules 202, which are partitioned into 4 array clusters. In the first-level splitting logical unit, each third splitting logical unit 2013 splits the first access command into four first sub-access commands. For example, the first access command has an access start address of 2000 and an access length of 32. The third splitting logical unit 2013 splits the first access command into four first sub-access commands that respectively have start addresses of 2000, 2008, 2010, and 2018 and have an access length of 8, and distributes the four first sub-access commands to the fourth splitting logical units 2014 of the second level in parallel. One of the fourth splitting logical units splits the first sub-access command with the start address of 2000 into two second sub-access commands that respectively have start addresses of 2000 and 2004 and have an access length of 4. Each second sub-access command is taken as a second access command, and the two second access commands are respectively transmitted to the two storage array modules in the corresponding array cluster (the first array cluster in the figure). Similarly, the other three first sub-access commands respectively correspond to the other three different array clusters. When a plurality of masters perform long burst accesses at the same time, the first access command of the long burst access of each master can be split independently, and different masters do not affect each other. In addition, each master can access all the storage array modules. In this way, the access time is greatly reduced and the access efficiency is improved when each storage array module is shared by different masters.

In this example, each master has an independent channel to access each storage array module, and different masters are independent of each other. On this basis, in combination with multi-level splitting and the coding and layout of the storage array module, multi-port long burst access with ultra-large scale and ultra-high traffic can be realized.

Figure 17:
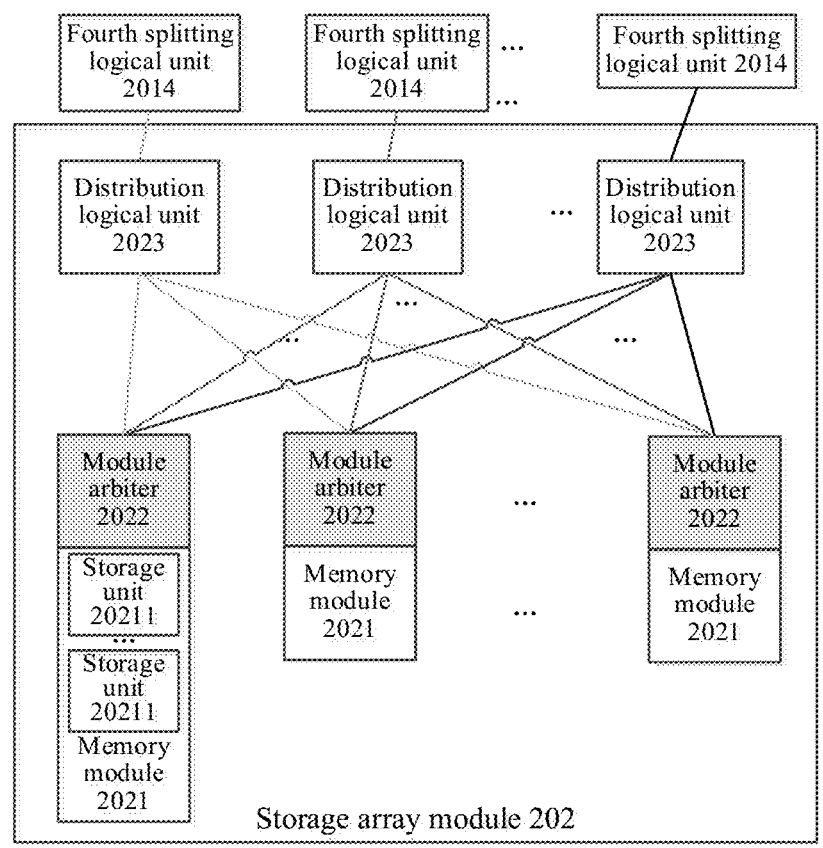
FIG. 17 is a schematic structural diagram of a storage array module 202 according to still another exemplary embodiment of this disclosure.

FIG. 17 is a schematic structural diagram of a storage array module 202 according to still another exemplary embodiment of this disclosure.

In an optional example, the storage array module 202 includes a distribution logical unit 2023 corresponding to each fourth splitting logical unit 2014 connected to this storage array module 202, at least one module arbiter 2022, and a memory module 2021 corresponding to each module arbiter 2022. Each memory module 2021 includes at least one storage unit 20211. Each distribution logical unit 2023 is connected to each module arbiter 2022 of the at least one module arbiter. Each distribution logical unit 2023 is configured to distribute the second access command to the module arbiter 2022 corresponding to the memory module 2021 based on the access address of the second access command of the fourth splitting logical unit 2014 corresponding to the distribution logical unit 2023. Each module arbiter 2022 of the at least one module arbiter is configured to determine, according to a preset arbitration rule, a target second access command of accessing the memory module 2021 corresponding to the module arbiter 2022. Each memory module 2021 is configured to perform a corresponding operation in response to the target second access command of accessing the memory module 2021.

A quantity of the memory modules may be set according to actual requirements. A quantity of the distribution logical units is the same as that of the fourth splitting logical units 2014 connected to the storage array module. A quantity of the fourth splitting logical units 2014 connected to the same storage array module may be set according to actual requirements, and the details are not described herein again with reference to the foregoing content. The corresponding operation performed by the memory module in response to the target second access command may include a read operation or a write operation, which is specifically performed based on an access type of the second access command. A specific reading/writing principle is not described.

In this example, the second access commands of different fourth splitting logical units 2014 can be distributed to module arbiters of corresponding memory modules by using different distribution logical units, to realize parallel distribution of a plurality of second access commands. When the storage array module is accessed by the second access commands corresponding to a plurality of masters at the same time, parallel distribution is implemented within the storage array module, thereby further improving the access efficiency. When a same memory module is accessed by a plurality of distributed second access commands, arbitration is performed by the module arbiter corresponding to the memory module, to determine the access order.

Figure 18:
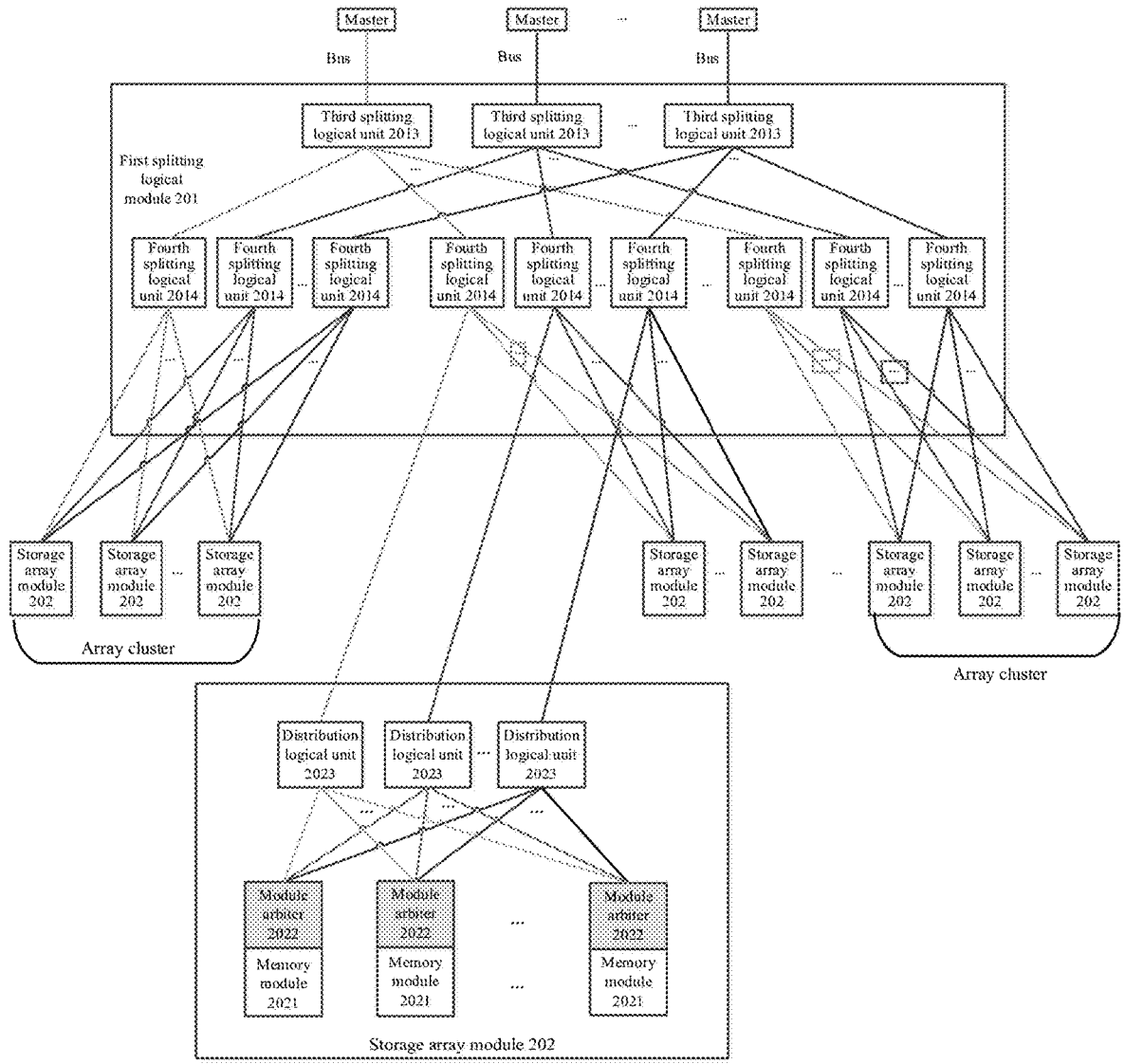
FIG. 18 is a schematic structural diagram of a storage device according to another exemplary embodiment of this disclosure.

In an optional example, FIG. 18 is a schematic structural diagram of a storage device according to another exemplary embodiment of this disclosure. In the figure, a structure of only one storage array module 202 is displayed. A structural principle of other storage array modules 202 is the same as that of this storage array module, and details are not described again. In this example, each master has an independent channel to be connected to the module arbiter. The independent channel includes a third splitting logical unit 2013, at least two fourth splitting logical units 2014 connected to the third splitting logical unit 2013, and a distribution logical unit connected to each fourth splitting logical unit 2014 of the at least two fourth splitting logical units. The first access command of each master may be split and distributed independently based on a relatively independent channel. Queued access is impossible to be met until at a memory-module stage. A probability of meeting may be reduced to a smaller level through address coding and layout and settings of the memory module, the storage array module, and the array cluster, thereby ensuring access efficiency of multi-port parallel access with ultra-large scale and ultra-high traffic.

For example, in a multi-core deep learning chip, a common scenario is that a segment of stored data (such as a weight parameter) is repeatedly read by a plurality of (such as X) acceleration cores (masters). Based on the storage device in this disclosure, for example, the storage array modules are partitioned into M array clusters, each of which includes N storage array modules each including K memory modules. In this case, M*N*K memory modules can jointly respond to address requests of the X acceleration cores, thereby greatly reducing the access time and improving the access efficiency. When the master has an in-burst disorder function, although a plurality of acceleration cores read at the same time, memory access performance of any acceleration core would not be significantly reduced as compared with a case in which only one acceleration core is read. The in-burst disorder function of the master means that data of different addresses that is allowed to be read is not required to be returned in sequence, but the data that can be returned is returned first. The master can form different returned results into required data. However, in an existing technology, when a plurality of acceleration cores read at the same time, reading performance may drop to 1/X. To prevent the reading performance from dropping to 1/X, optimization needs to be performed by a stagger manner of using additional memory access time by means of software, or a same set of data needs to be copied for a plurality of copies to be stored separately, which results in resource waste. It can be learned that, compared with the existing technology, the storage device in this disclosure not only greatly improves the access efficiency, but also needs not to use additional memory access time by means of software to perform stagger optimization and to avoid resource waste caused by storage of a plurality of copies.

In an optional example, a number of splitting levels of the first splitting logical module 201 and splitting granularity of each level can be specifically determined based on a situation of a floorplan, storage requirements, and data of a parallel masters, and it is not limited to the foregoing two-level splitting in FIG. 18. For example, a deep learning acceleration chip requires more storage array modules, occupying a larger area. With parallel access of a plurality of masters, congestion caused by wire winding may become an area bottleneck. In this case, a level number of distribution of a bus outside the storage array module and granularity of splitting at each level can be flexibly determined based on the floorplan, and a combination of a quantity of the masters and a material resource which are best matched can be determined.

In an optional example, the memory modules in the storage array module 202 may also be further partitioned horizontally or longitudinally according to actual requirements. When a same memory module is accessed by a plurality of second access commands at the same time, if access addresses of two second access commands are different, storage units in different regions of the memory module can respond respectively, thereby further improving the access efficiency.

In an optional example, a memory module 2021 may be a storage unit. Each master is connected to one third splitting logical unit 2013 by using an independent bus. One third splitting logical unit is respectively connected to at least two fourth splitting logical units 2014 in parallel by using a bus. Each fourth splitting logical unit 2014 is connected to one distribution logical unit 2023 in one storage array module 202. Each distribution logical unit 2023 is respectively connected, by using buses, to all the memory modules 2021 in the storage array module where the distribution logical unit 2023 is located. In this way, each master has an independent multi-level distribution bus, so that long burst transmission of the master is decomposed into small modules and is transmitted to the corresponding storage array module in parallel. Through an address coding and layout of the storage array module, it is ensured that for the same burst, there would not be a case in which the transmissions of plurality of individual modules fallen into a same storage array module. In the storage array module 202, each master has a respective independent distribution bus. Through an address coding and layout, individual-module access is transmitted to the corresponding storage unit in the storage array module. Access of a plurality of masters is not arbitrated until all the storage units are reached, and channels prior to the arbitration are all independent. In this way, not only a higher degree of parallelism is ensured, mutual influence between different masters is reduced, but also better hardware isolation is achieved, thereby achieving effective compatibility and supporting for ISO26262. In addition, bandwidth parallelism of the storage array module for a same master is achieved and improved through multi-level distribution outside the storage array module and one-to-more distribution within the storage array module.

Based on the storage device in this disclosure, the preset address coding and layout rule may be set to be in a plurality of modes according to specific requirements of the chip. For scenarios with security requirements on virtualization or hardware isolation and so forth, through the address coding and layout, a same storage array module would not be accessed by different masters. In combination with that different masters use completely independent buses and distribution logic, complete physical isolation of different masters can also be achieved. In a scenario without isolation requirements, long burst access may be distributed to different memory modules through full address space coding, to ensure that all the memory modules have relatively average utilization in a non-extreme scenario. Moreover, an effect of such uniform use can be guaranteed by hardware. The software does not need to do additional adaptation work, which improves user-friendliness and development flexibility of the software, greatly reduces workload of software development, and reduces debugging requirements and risks caused by insufficient software optimization in a later stage.

Figure 19:
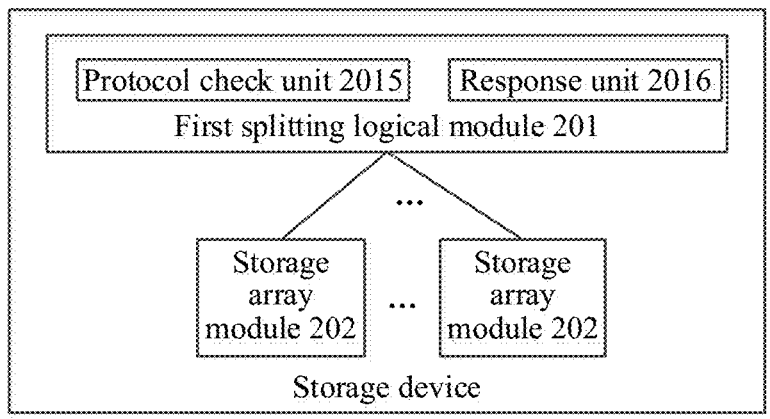
FIG. 19 is a schematic structural diagram of a storage device according to still another exemplary embodiment of this disclosure.

FIG. 19 is a schematic structural diagram of a storage device according to still another exemplary embodiment of this disclosure.

In an optional example, the first splitting logical module 201 further includes a protocol check unit 2015 that is configured to perform a bus protocol check.

The protocol check unit 2015 may perform the bus protocol check based on an access response, such as a timeout check or an end-to-end ECC code check, etc. This may be specifically set according to actual requirements.

For example, the protocol check unit 2015 may be provided for a chip with higher security requirements.

In an optional example, the protocol check unit 2015 may be disposed in a splitting logical unit (such as the first splitting logical unit 2011, the second splitting logical unit 2012, or the third splitting logical unit 2013 described above) in the first-level splitting logical unit, or may be a unit independent of the splitting logical unit in the first-level splitting logical unit. This may be specifically set according to actual requirements.

In an optional example, the first splitting logical module 201 further includes a response unit 2016 that is configured to, based on an access result returned by the storage array module 202, in response to that a corresponding master supports in-burst disorder, transmit the access result to the master; and in response to that the master does not support the in-burst disorder, sort the access result and then transmit sorted access result to the master.

The in-burst disorder refers to out-of-order transmission. For example, for write transmission, a write address and write data sent by a same master are out of order. For example, m1 sends two write commands CMD1 and CMD2 in sequence to access S1 and S2 respectively. In this case, write data may be sent to S2 first and then write data is sent to S1. For read transmission, a read address received by a same slave (such as the storage device in this disclosure) may be out of order with returned read data. For a write command sent by a same master or a read command received by a same slave, the inter-burst transmissions are crossing and out of order. For example, m1 sends two write commands CMD1 and CMD2 in sequence, and during data writing, data of CMD2 may be sent when sending of data of CMD1 is not finished. A specific principle of the in-burst disorder is not described here. In combination with internal disorder of the master, the access result returned by the storage array module 202 in this disclosure can be returned to the master in time, so that response efficiency of each storage array module can be further improved.

By using storage response with a high degree of parallelism and a function of supporting in-burst disorder, the storage device in this disclosure can effectively reduce delay impact caused by an access conflict when a same address space is accessed by a plurality of masters at the same time. While providing stable high bandwidth and low latency, parallel response of a plurality of memory modules also reduces impact of efficiency of a single storage unit on memory access performance. Access performance of a large data block would not be affected even though a running frequency of the memory module is reduced. For example, a SRAM (static random access memory) may be asynchronous relative to a bus, or run on a 1/F bus frequency, where F may be any valid integer. A SRAM memory module with better area and power consumption may be selected according to an actual chip frequency and process.

In an optional example, the response unit 2016 may be disposed in a splitting logical unit (such as the first splitting logical unit 2011, the second splitting logical unit 2012 and the third splitting logical unit 2013 described above) in the first-level splitting logical units, or may be a unit independent of the splitting logical unit in the first-level splitting logical units. This may be specifically set according to actual requirements.

In an optional example, the response unit 2016 may be disposed in each splitting logical unit of each level of splitting logical units in a plurality of levels of splitting logical units (such as the first splitting logical unit 2011, the second splitting logical unit 2012, the third splitting logical unit 2013 and the fourth splitting logical unit 2014 at each level described above), to report an access result returned from a lower level to an upper level. The corresponding response unit may also be disposed in the distribution logical unit 2023 of the storage array module 202, to report an access result returned by the memory module to the splitting logical unit to which the response unit is connected. This may be specifically set according to actual requirements. The result returned from each level may be transmitted by using a bus, and a specific transmission principle is not described here.

In an optional example, in the storage device according to this disclosure, a connection between the first splitting logical units 2011 in different levels, and a connection between the first splitting logical unit 2011 in the last level and the corresponding storage array module 202 may be implemented by using buses. The second splitting logical unit 2012 may be connected to each storage array module 202 by using a bus. A connection between the third splitting logical unit 2013 and the fourth splitting logical unit 2014, and a connection between the fourth splitting logical unit 2014 and each storage array module 202 may also be implemented by using buses. Each fourth splitting logical unit 2014 is also connected to the distribution logical unit 2023 by using a bus. Correspondingly, after the first access command of the master is split and distributed to the memory module, a response result of the memory module is returned to the master level by level via a return channel that is same to a path of an access process. A specific bus transmission principle is not described herein. The bus in this disclosure may be set according to actual requirements; for example, AMBA (Advanced Microcontroller Bus Architecture) bus.

In an optional example, different levels of splitting logical units in at least one level of splitting logical units have a same working frequency or different working frequencies; and/or the at least one level of splitting logical units and the at least two storage array modules have a same working frequency or different working frequencies.

The working frequency may be synchronous or asynchronous. This may be set according to actual requirements. Specifically, a corresponding working frequency may be set for each level of splitting logical units according to actual requirements, and the working frequency may be the same as or different from that of another level of splitting logical units. The working frequency of each level of splitting logical units may also be the same as or different from that of the storage array module, which is not specifically limited. For example, the first-level splitting logical unit has a working frequency of 1 GHz (gigahertz), and the second-level splitting logical unit has a working frequency of 0.5 GHz (gigahertz). This is merely an example, rather than a limitation on an actual working frequency. In actual application, the working frequencies of each level of splitting logical units and the storage array module may be set to any required frequency value according to actual requirements. This is not limited in this disclosure.

In an optional example, for a chip with certain security requirements, stored data may be protected based on a preset code. For example, the stored data is protected by setting parity or ECC (error correcting code). For such a situation, a corresponding splitting rule can be set according to the preset address coding and layout rule. For example, a 128-bit number may be split into two (64+8)-bit numbers for protection and storage, thereby improving access efficiency. Specific splitting may be set according to actual requirements.

According to the storage device in this disclosure, through multi-level splitting and distribution logic, the long-burst access is decomposed into small-module access, and the small-module access is evenly distributed to a lot of parallel memory modules by using the address coding and layout. By offsetting impact caused by a conflict in parallel access of a plurality of masters through a high degree of parallelism, stable and high flow of data access in a multi-core parallel operation environment is realized, and determinability of access delay and high transparency of software use are ensured. The storage device in this disclosure can be applied to a multi-port parallel on-chip shared storage system with ultra-large scale and high traffic. In addition, the storage device in this disclosure achieves high scalability and ease of implementation through modularization and high structurization, and ensures consistency and certainty of large-capacity memory access. The storage device in this disclosure can be implemented on a FPGA (Field Programmable Gate Array), a SoC (System on Chip), an ASIC (Application Specific Integrated Circuit), and the like.

Exemplary Method

Figure 20:
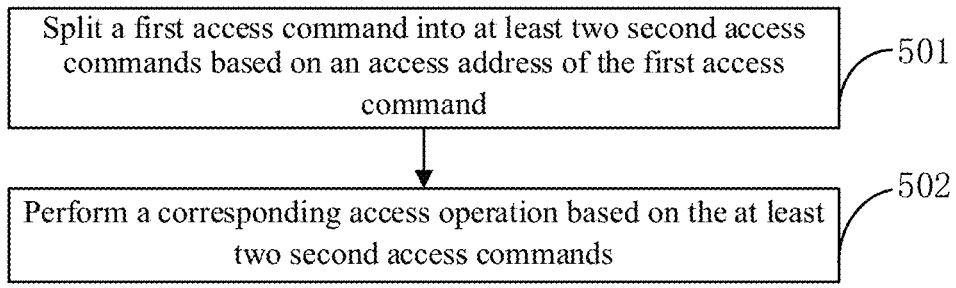
FIG. 20 is a schematic flowchart of a storage method according to an exemplary embodiment of this disclosure.

FIG. 20 is a schematic flowchart of a storage method according to an exemplary embodiment of this disclosure. This embodiment can be applied to an electronic device, specifically, such as an in-car computing platform for automatic driving. The storage method in this disclosure may be implemented by the storage device provided in any one of the foregoing embodiments or optional examples. As shown in FIG. 20, the method includes the following steps:

Step 501, splitting a first access command into at least two second access commands based on an access address of the first access command.

Step 502, performing a corresponding access operation based on the at least two second access commands.

For specific operations of the foregoing steps, refer to the foregoing embodiments, and details are not described herein again.

According to the storage method provided in this embodiment, the first access command with relatively long burst is split into second access commands with smaller granularity, and the at least two storage array modules are accessed in parallel, so that the at least two storage array modules can respond in parallel, thereby effectively reducing response time of the first access command with relatively long burst. In this way, when parallel access of a plurality of masters exists, access time of each master access can be effectively reduced, thereby improving the access efficiency.

Figure 21:
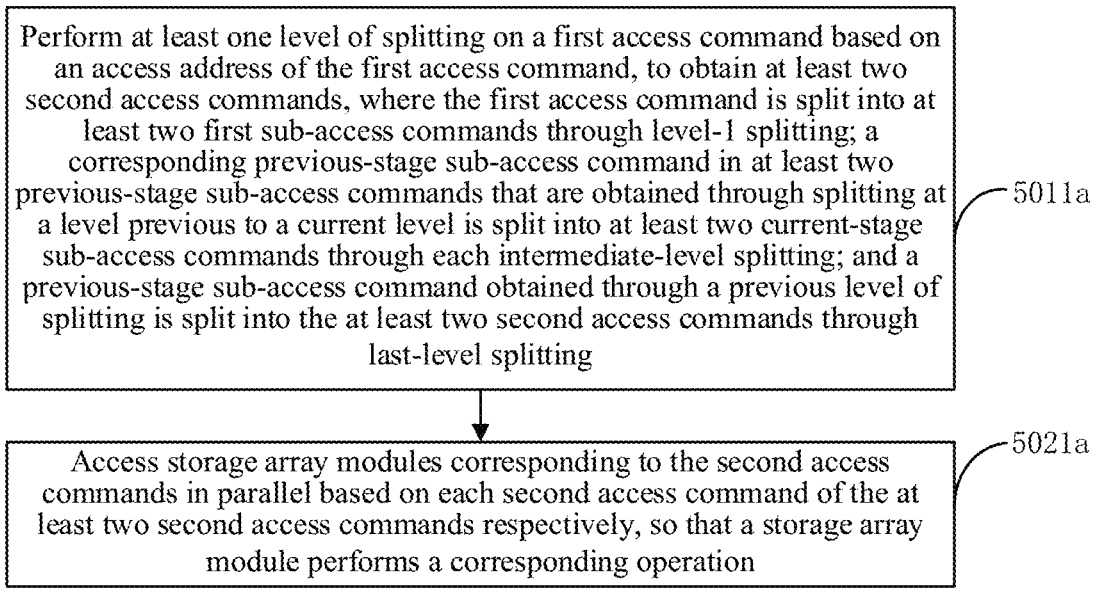
FIG. 21 is a schematic flowchart of a storage method according to another exemplary embodiment of this disclosure.

FIG. 21 is a schematic flowchart of a storage method according to another exemplary embodiment of this disclosure.

In an optional example, Step 501, that is, splitting the first access command into at least two second access commands based on the access address of the first access command, includes:

Step S011*a*, performing at least one level of splitting on the first access command based on the access address of the first access command, to obtain the at least two second access commands, wherein the first access command is split into at least two first sub-access commands through level-1 splitting; splitting a corresponding previous-level sub-access command in at least two previous-level sub-access commands that are obtained through splitting at a level previous to a current level, into at least two current-level sub-access commands through each intermediate-level splitting; and splitting a previous-level sub-access command obtained through a previous level of splitting, into the at least two second access commands through last-level splitting.

In an optional example, Step 502, that is, performing the corresponding access operation based on the at least two second access commands, includes:

5021*a*, accessing storage array modules corresponding to the second access commands in parallel based on each second access command of the at least two second access commands respectively, so that the storage array module performs a corresponding operation.

In an optional example, step S021*a*, that is, accessing the storage array modules corresponding to the second access commands in parallel based on each second access command of the at least two second access commands respectively, so that the storage array module performs a corresponding operation, includes: for each second access command, determining, according to a preset arbitration rule, a target second access command of accessing each memory module in the storage array module, so that each memory module performs a corresponding operation in response to the target second access command.

Figure 22:
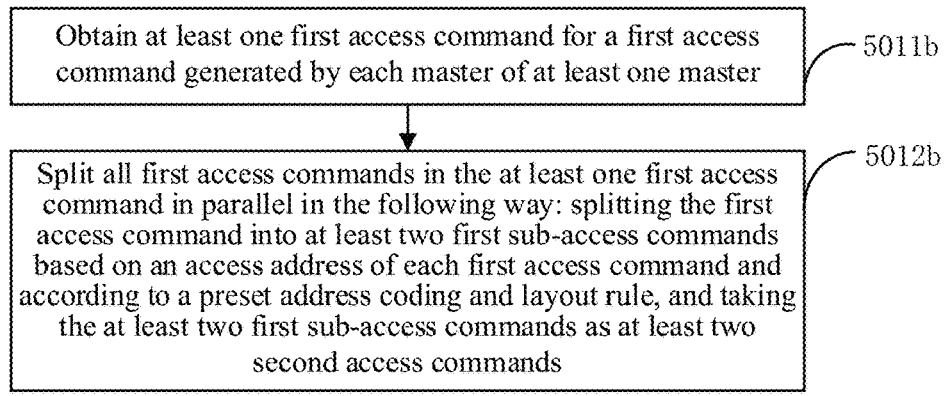
FIG. 22 is a schematic flowchart of step 501 according to an exemplary embodiment of this disclosure.

FIG. 22 is a schematic flowchart of Step 501 according to an exemplary embodiment of this disclosure.

In an optional example, Step 501, that is, splitting the first access command into at least two second access commands based on the access address of the first access command, includes:

Step S011*b*, obtaining at least one first access command for the first access command generated by each master of at least one master; and Step S012*b*, splitting all the first access commands of the at least one first access command in parallel in the following way: splitting the first access command into at least two first sub-access commands based on the access address of each first access command and according to a preset address coding and layout rule, and taking the at least two first sub-access commands as the at least two second access commands.

Figure 23:
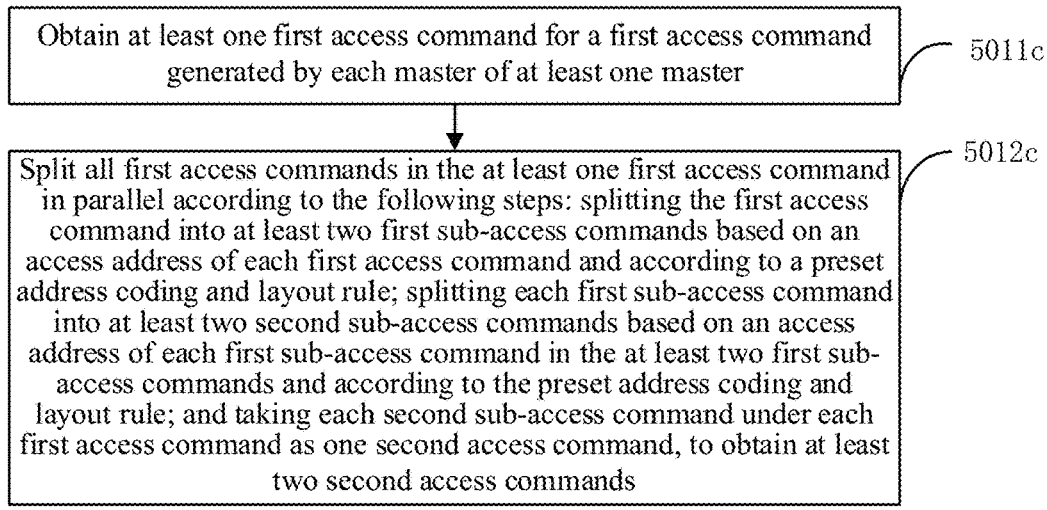
FIG. 23 is a schematic flowchart of step 501 according to another exemplary embodiment of this disclosure.

FIG. 23 is a schematic flowchart of Step 501 according to another exemplary embodiment of this disclosure.

In an optional example, Step 501, that is, splitting the first access command into at least two second access commands based on the access address of the first access command, includes:

Step S011*c*, obtaining at least one first access command for the first access command generated by each master of at least one master.

Step S012*c*, splitting all the first access commands of the at least one first access command in parallel according to the following steps: splitting the first access command into at least two first sub-access commands based on the access address of each first access command and according to a preset address coding and layout rule; splitting each first sub-access command into at least two second sub-access commands based on an access address of each first sub-access command of the at least two first sub-access commands and according to the preset address coding and layout rule; and taking each second sub-access command under each first access command as one second access command, to obtain the at least two second access commands.

Figure 24:
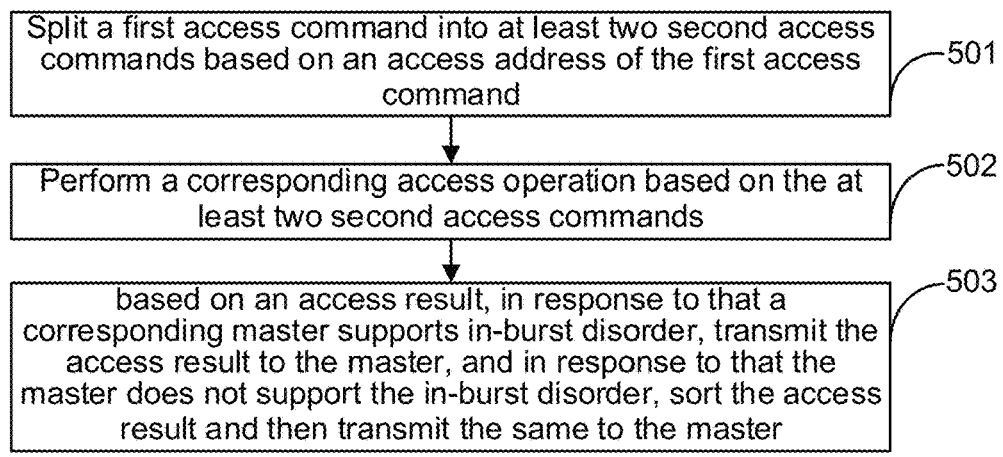
FIG. 24 is a schematic flowchart of a storage method according to still another exemplary embodiment of this disclosure.

FIG. 24 is a schematic flowchart of a storage method according to still another exemplary embodiment of this disclosure.

In an optional example, the method in this disclosure further includes:

Step 503, based on an access result, in response to that a corresponding master supports in-burst disorder, transmitting the access result to the master; and in response to that the master does not support the in-burst disorder, sorting the access result and then transmitting the sorted access result to the master.

In an optional example, the method in this disclosure can further include: performing a bus protocol check.

For specific operations of the foregoing steps in this disclosure, refer to the device embodiments described above, and details are not described herein again.

In an optional example, different levels of splitting in at least one level of splitting in this disclosure may have a same working frequency or different working frequencies; and/or the at least one level of splitting and the storage array module may have a same working frequency or different working frequencies. The working frequency may be synchronous or asynchronous.

Any storage method provided in the embodiments of this disclosure can be implemented by any suitable device with a data processing capability, including but not limited to a terminal device and a server. Alternatively, any storage method provided in the embodiments of this disclosure can be implemented by a processor. For example, the processor implements any storage method described in the embodiments of this disclosure by invoking corresponding instructions stored in a memory. Details are not described below again.

Exemplary Electronic Device

An embodiment of this disclosure further provides an electronic device, including: a memory, configured to store a computer program; and a processor, configured to execute the computer program stored in the memory, wherein when the computer program is executed, the storage method according to any one of the foregoing embodiments of this disclosure is implemented.

Figure 25:
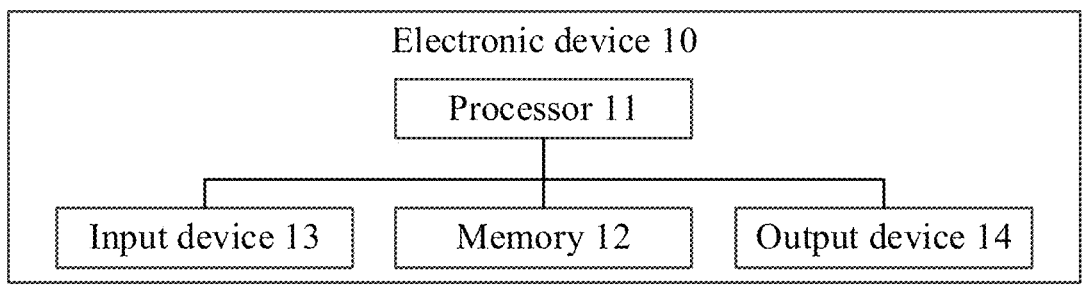
FIG. 25 is a schematic structural diagram of an application embodiment of an electronic device according to this disclosure.

FIG. 25 is a schematic structural diagram of an application embodiment of an electronic device according to this disclosure. In this embodiment, an electronic device 10 includes one or more processors 11 and a memory 12.

The processor 11 may be a central processing unit (CPU) or another form of processing unit having a data processing capability and/or an instruction execution capability, and may control another component in the electronic device 10 to perform a desired function.

The memory 12 may include one or more computer program products. The computer program product may include various forms of computer readable storage media, such as a volatile memory and/or a non-volatile memory. The volatile memory can include, for example, a random access memory (RAM) and/or a cache. The nonvolatile memory can include, for example, a read-only memory (ROM), a hard disk, and a flash memory. One or more computer program instructions can be stored on the computer readable storage medium. The processor 11 can execute the program instruction to implement the method according to various embodiments of this disclosure that are described above and/or other desired functions. Various contents such as an input signal, a signal component, a noise component and so forth may also be stored in the computer readable storage medium.

In an example, the electronic device 10 may further include an input unit 13 and an output unit 14. These components are connected with each other through a bus system and/or another form of connection mechanism (not shown).

For example, the input unit 13 may be a microphone or a microphone array, which is configured to capture an input signal of a sound source.

In addition, the input unit 13 may further include, for example, a keyboard, a mouse and so forth.

The output unit 14 can output various information to the outside, including determined distance information, direction information, and the like. The output unit 14 may include, for example, a display, a loudspeaker, a printer, a communication network, and a remote output device connected to the communication network, and the like.

Certainly, for simplicity, FIG. 25 shows only some of components in the electronic device 10 that are related to this disclosure, and components such as a bus, an input/output interface and so forth are omitted. In addition, according to specific application situations, the electronic device 10 can further include any other appropriate components.

Figure 26:
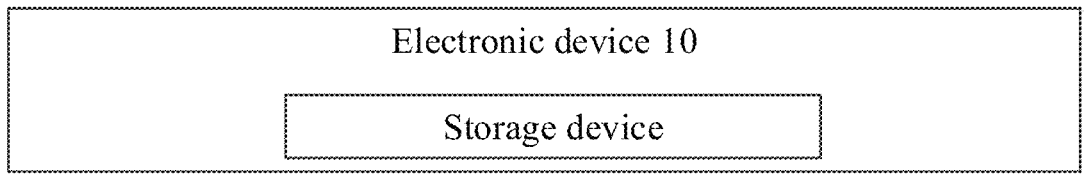
FIG. 26 is a schematic structural diagram of another application embodiment of an electronic device according to this disclosure.

In an optional example, FIG. 26 is a schematic structural diagram of another application embodiment of an electronic device according to this disclosure. In this example, the electronic device 10 includes the storage device provided in any one of the foregoing embodiments.

Exemplary Computer Program Product and Computer Readable Storage Medium

In addition to the foregoing method and device, the embodiments of this disclosure can also be a computer program product, which includes computer program instructions. When the computer program instructions are run by a processor, the processor is enabled to perform the steps, of the method according to the embodiments of this disclosure, that are described in the "exemplary method" part of this specification.

The computer program product may be program codes, written with one or any combination of a plurality of programming languages, which are configured to perform the operations in the embodiments of this disclosure. The programming languages include an object-oriented programming language such as Java, C++, and so forth, and further include a conventional procedural programming language such as a "C" language or a similar programming language. The program codes can be entirely or partially executed on a user computing device, executed as an independent software package, partially executed on the user computing device and partially executed on a remote computing device, or entirely executed on the remote computing device or a server.

In addition, the embodiments of this disclosure can further be a computer readable storage medium, which stores computer program instructions. When the computer program instructions are run by the processor, the processor is enabled to perform the steps, of the method according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to, electricity, magnetism, light, electromagnetism, infrared ray, or a semiconductor system, apparatus, or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, it should be pointed out that the advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

The block diagrams of the equipment, the apparatus, the device, and the system involved in this disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system can be connected, arranged, and configured in an arbitrary manner. The terms such as "include", "contain", and "have" and so forth are open terms that mean "including but not limited to", and can be used interchangeably with "including but not limited to". The terms "or" and "and" used herein refer to the term "and/or", and can be used interchangeably with "and/or", unless the context clearly indicates otherwise. The term "such as" used herein refers to the phrase "such as but not limited to", and can be used interchangeably with "such as but not limited to".

It should be further pointed out that, various components or various steps in the apparatus, the device, and the method of this disclosure can be disassembled and/or recombined. These disassembling and/or recombinations shall be regarded as equivalent solutions of this disclosure.

What is claimed is:
1. A storage method, comprising:
splitting a first access command into at least two second access commands based on an access address of the first access command;
performing a corresponding access operation based on the at least two second access commands; and
based on an access result, in response to that a corresponding master supports in-burst disorder, transmitting the access result to the master, and in response to that the master does not support the in-burst disorder, sorting the access result and then transmitting the access result that is sorted to the master.

2. The method according to claim 1, wherein the splitting a first access command into at least two second access commands based on an access address of the first access command comprises:

performing at least one level of splitting on the first access command based on the access address of the first access command, to obtain the at least two second access commands, wherein the first access command is split into at least two first sub-access commands through first-level splitting; splitting a corresponding previous-level sub-access command in at least two previous-level sub-access commands that are obtained through splitting at a level previous to a current level, into at least two current-level sub-access commands through each intermediate-level splitting; and splitting a previous-level sub-access command obtained through a previous level of splitting, into the at least two second access commands through last-level splitting.

3. The method according to claim 1, wherein the performing a corresponding access operation based on the at least two second access commands comprises:

accessing storage array modules corresponding to the second access commands in parallel based on each second access command of the at least two second access commands, whereby each memory module in the storage array module performs a corresponding operation.

4. The method according to claim 1, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule, and taking the at least two first sub-access commands as the at least two second access commands.

5. The method according to claim 1, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule;

splitting the first sub-access command into at least two second sub-access commands based on an access address of each first sub-access command of the at least two first sub-access commands and according to the preset address coding and layout rule; and taking each second sub-access command as one second access command, to obtain the at least two second access commands.

6. An electronic device, wherein the electronic device comprises:

a processor; and a memory, configured to store processor-executable instructions, wherein the processor is configured to read the executable instructions from the memory, and execute the instructions to implement a storage method, wherein the storage method comprises: splitting a first access command into at least two second access commands based on an access address of the first access command; performing a corresponding access operation based on the at least two second access commands; and based on an access result, in response to that a corresponding master supports in-burst disorder, transmitting the access result to the master, and in response to that the master does not support the in-burst disorder, sorting the access result and then transmitting the access result that is sorted to the master.

7. The electronic device according to claim 6, wherein the splitting a first access command into at least two second access commands based on an access address of the first access command comprises:

performing at least one level of splitting on the first access command based on the access address of the first access command, to obtain the at least two second access commands, wherein the first access command is split into at least two first sub-access commands through first-level splitting; splitting a corresponding previous-level sub-access command in at least two previous-level sub-access commands that are obtained through splitting at a level previous to a current level, into at least two current-level sub-access commands through each intermediate-level splitting; and splitting a previous-level sub-access command obtained through a previous level of splitting, into the at least two second access commands through last-level splitting.

8. The electronic device according to claim 6, wherein the performing a corresponding access operation based on the at least two second access commands comprises:

accessing storage array modules corresponding to the second access commands in parallel based on each second access command of the at least two second access commands, whereby each memory module in the storage array module performs a corresponding operation.

9. The electronic device according to claim 6, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule, and taking the at least two first sub-access commands as the at least two second access commands.

10. The electronic device according to claim 6, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule;

splitting the first sub-access command into at least two second sub-access commands based on an access address of each first sub-access command of the at least two first sub-access commands and according to the preset address coding and layout rule; and taking each second sub-access command as one second access command, to obtain the at least two second access commands.

11. A non-transitory computer readable storage medium, which stores computer program instructions, when run by a processor, the processor is enabled to perform a storage method, wherein the storage method comprises: splitting a first access command into at least two second access commands based on an access address of the first access command; performing a corresponding access operation based on the at least two second access commands; and based on an access result, in response to that a corresponding master supports in-burst disorder, transmitting the access result to the master, and in response to that the master does not support the in-burst disorder, sorting the access result and then transmitting the sorted access result to the master.

12. The non-transitory computer readable storage medium according to claim 11, wherein the splitting a first access command into at least two second access commands based on an access address of the first access command comprises:

performing at least one level of splitting on the first access command based on the access address of the first access command, to obtain the at least two second access commands, wherein the first access command is split into at least two first sub-access commands through first-level splitting; splitting a corresponding previous-level sub-access command in at least two previous-level sub-access commands that are obtained through splitting at a level previous to a current level, into at least two current-level sub-access commands through each intermediate-level splitting; and splitting a previous-level sub-access command obtained through a previous level of splitting, into the at least two second access commands through last-level splitting.

13. The non-transitory computer readable storage medium according to claim 11, wherein the performing a corresponding access operation based on the at least two second access commands comprises:

accessing storage array modules corresponding to the second access commands in parallel based on each second access command of the at least two second access commands, whereby each memory module in the storage array module performs a corresponding operation.

14. The non-transitory computer readable storage medium according to claim 11, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule, and taking the at least two first sub-access commands as the at least two second access commands.

15. The non-transitory computer readable storage medium according to claim 11, wherein the splitting a first access command into at least two second access commands based on an access address of the first access command comprises:

obtaining at least one first access command for the first access command generated by each master of at least one master, and splitting all the first access commands of the at least one first access command in parallel in the following way:

splitting the first access command into at least two first sub-access commands based on the access address of each first access command and according to a preset address coding and layout rule;

splitting the first sub-access command into at least two second sub-access commands based on an access address of each first sub-access command of the at least two first sub-access commands and according to the preset address coding and layout rule; and taking each second sub-access command as one second access command, to obtain the at least two second access commands.

* * * * *